(12) United States Patent
Onishi

(10) Patent No.: US 8,654,101 B2
(45) Date of Patent: Feb. 18, 2014

(54) POSITION DETECTING DEVICE AND ELECTRO-OPTICAL DEVICE

(75) Inventor: Yasunori Onishi, Shiojiri (JP)

(73) Assignee: Epson Imaging Devices Corporation (JP)

( * ) Notice: Subject to any disclaimer, the term of this patent is extended or adjusted under 35 U.S.C. 154(b) by 986 days.

(21) Appl. No.: 12/732,417

(22) Filed: Mar. 26, 2010

(65) Prior Publication Data

US 2010/0245293 A1 Sep. 30, 2010

(30) Foreign Application Priority Data

Mar. 27, 2009 (JP) ................................ 2009-078365

(51) Int. Cl.
*G06F 3/041* (2006.01)
*G06F 3/042* (2006.01)
(52) U.S. Cl.
USPC .......................................... 345/175; 345/173
(58) Field of Classification Search
None
See application file for complete search history.

(56) References Cited

U.S. PATENT DOCUMENTS

| 2001/0019479 | A1* | 9/2001 | Nakabayashi et al. | 362/31 |
| 2003/0155487 | A1* | 8/2003 | Reime | 250/221 |
| 2007/0170449 | A1* | 7/2007 | Anandan | 257/98 |
| 2007/0296688 | A1* | 12/2007 | Nakamura et al. | 345/102 |
| 2009/0167656 | A1* | 7/2009 | Ahn et al. | 345/87 |
| 2009/0267919 | A1* | 10/2009 | Chao et al. | 345/175 |
| 2010/0053136 | A1* | 3/2010 | Ohta et al. | 345/211 |
| 2010/0060611 | A1* | 3/2010 | Nie | 345/175 |

FOREIGN PATENT DOCUMENTS

| JP | 2004-295644 A | 10/2004 |
| JP | 2004-303172 A | 10/2004 |
| WO | WO 2006095320 A2 * | 9/2006 |
| WO | WO 2007029257 A2 * | 3/2007 |

* cited by examiner

*Primary Examiner* — Alexander S Beck
*Assistant Examiner* — Kirk Hermann
(74) *Attorney, Agent, or Firm* — Harness, Dickey & Pierce, P.L.C.

(57) ABSTRACT

An optical position detecting unit can be configured at low cost and so as to have lower power consumption. A position detecting device includes a light guide plate, multiple light sources for position detection, a photosensor, a light source control unit that switches between a first driving mode and a second driving mode, the first driving mode being a mode in which discharged light intensities of the multiple light sources for position detection are gradually decreased toward one side of an arrangement direction of the multiple light sources for position detection and in which emitted light intensities of the position detection light beams emitted from the light emitting face exhibit a first light emission distribution tilted toward the one side of the arrangement direction, the second driving mode being a mode in which discharged light intensities of the multiple light sources for position detection are gradually decreased toward another side opposite the one side of the arrangement direction and in which emitted light intensities of the position detection light beams emitted from the light emitting face exhibit a second light emission distribution tilted toward the other side of the arrangement direction, and a position information derivation unit that derives position information regarding the object to be detected along the arrangement direction on the basis of output components of the photosensor respectively attributable to the first light emission distribution and the second light emission distribution.

7 Claims, 16 Drawing Sheets

POSITION DETECTING DEVICE AND ELECTRO-OPTICAL DEVICE

BACKGROUND

1. Technical Field

The present invention relates to position detecting devices and electro-optical devices, and more particularly, to configurations of devices that obtain position information regarding an object to be detected on the basis of values which have been optically detected.

2. Related Art

In typical display devices equipped with an electro-optical device such as a liquid crystal display body, a lighting device such as a backlight may be incorporated in order to make the display screen visible or enhance the visibility. In addition, in the display devices, the display screen may be provided with a pointed position detecting unit such as a touch panel. In this case, when a given position on the display screen is pointed by a pen, a finger or the like, the pointed position is detected and input into an information processing device or the like.

As the pointed position detecting unit (positional coordinate inputting unit) such as a touch panel, electrostatic capacitive type touch panels, resistive film type touch panels or the like that mechanically or electrically detect the state of a contact on the display screen are known. In addition, optical touch panels are known in which a grid of infrared light beams is formed across the display screen and photosensors are correspondingly provided so as to detect the infrared light beams, so that, when a finger or the like interrupts infrared light beams, the positional coordinates of the finger or the like can be detected. In general, various types of optical touch panels are known, and examples of the optical touch panels include the ones disclosed in JP-A-2004-295644 and JP-A-2004-303172.

However, in the optical touch panels described above, it is necessary to arrange, adjacent to the display screen, multiple light sources and photosensors, optical switches, or light guide structures or the like in order to support the resolution of positional coordinates to be detected. This increases the number of optical elements, whereby there is a problem in that the manufacturing cost is increased and more power is consumed.

SUMMARY

An advantage of some aspects of the invention is that a position detecting device and an electro-optical device (display device) are realized, in which an optical position detecting unit can be configured at low cost and so as to have lower power consumption.

A position detecting device according to a first aspect of the invention includes a light guide plate that is configured to transmit therethrough light beams entering from a light incident face thereof and to emit the light beams from a light emitting face intersecting the light incident face, multiple light sources for position detection that are arranged along the light incident face and that discharge position detection light beams toward the light incident face, a photosensor that detects position detection light beams reflected by an object to be detected among the position detection light beams emitted from the light emitting face, a light source control unit that switches between a first driving mode and a second driving mode, the first driving mode being a mode in which discharged light intensities of the multiple light sources for position detection are gradually decreased toward one side of an arrangement direction of the multiple light sources for position detection and in which emitted light intensities of the position detection light beams emitted from the light emitting face exhibit a first light emission distribution tilted toward the one side of the arrangement direction, the second driving mode being a mode in which discharged light intensities of the multiple light sources for position detection are gradually decreased toward another side opposite the one side of the arrangement direction and in which emitted light intensities of the position detection light beams emitted from the light emitting face exhibit a second light emission distribution tilted toward the other side of the arrangement direction, and a position information derivation unit that derives position information regarding the object to be detected along the arrangement direction on the basis of output components of the photosensor respectively attributable to the first light emission distribution and the second light emission distribution.

According to the first aspect of the invention, the light source control unit controls the multiple light sources for position detection so as to form, as light intensity distributions of the position detection light beams emitted from the light emitting face of the light guide plate, a first light emission distribution and a second light emission distribution respectively tilted toward the one side and the other side of the arrangement direction of the multiple light sources for position detection along the light incident face of the light guide plate. When both light emission distributions are formed, at least some of the light beams reflected by the object to be detected are detected for both light emission distributions by the photosensor, and values corresponding to the respective light intensities detected are output. The outputs of the photosensor vary depending on the position of the object to be detected in the arrangement direction in accordance with the tilts of both light emission distributions that the emitted light intensities exhibit along the arrangement direction. Thus, position information regarding the object to be detected in the arrangement direction can be determined on the basis of the output components of the photosensor attributable to the respective light emission distributions. In particular, when the light beams that are based on the first light emission distribution and the second light emission distribution and that are reflected by the object to be detected are detected by the photosensor and position information regarding the object to be detected in the arrangement direction is determined on the basis of the output components attributable to the respective distributions, the position information is less influenced by the outside light beams and level fluctuations in emitted light intensities or reflected light intensities, whereby the accuracy and the reproducibility of the position information can be enhanced.

According to the first aspect of the invention, as described above, the multiple light sources for position detection that discharge position detection light beams are arranged on the light incident face of the light guide plate, and are driven by the light source control unit to form the first light emission distribution and the second light emission distribution respectively tilted toward the opposite sides from each other, and the light beams reflected by the object to be detected of both light emission distributions are detected by the photosensor. Therefore, there is no need to prepare the light sources for position detection and photosensors in a number corresponding to the resolution, whereby the number of elements needed can be reduced and also the power consumption can be reduced. Consequently, the optical position detecting unit can be configured at low cost and so as to have low power consumption.

In this case, the method of deriving position information regarding the object to be detected on the basis of the output components of the photosensor attributable to the respective light emission distributions may be any method. Examples of such a method may include not only a method in which the position information is obtained directly by using the ratio or difference of the output components of the photosensor attributable to the respective light emission distributions, but also a method in which, when the level of one of the light emission distributions is changed so that the output components match each other of the photosensor attributable to the respective light emission distributions, the position information regarding the object to be detected is derived on the basis of the amount of change in the level.

It is preferable that the light source control unit alternately forms the first light emission distribution and the second light emission distribution. Therefore, detection of the reflected light beams by the photosensor on the basis of the first light emission distribution and detection of the reflected light beams by the photosensor on the basis of the second light emission distribution can be performed successively, whereby both detections can be performed in a close time period. Especially in the case where the driving of the light sources for position detection for forming the first light emission distribution and the driving of the light sources for position detection for forming the second light emission distribution are performed in reverse phase on the basis of a predetermined drive period, the output components attributable to the respective light emission distributions can be easily distinguished from each other by phase analysis of detection signals of the photosensor.

It is also preferable that the light guide plate includes two light incident faces facing each other with the light emitting face therebetween, that the multiple light sources for position detection are arranged along the two light incident faces, and that the light source control unit forms the first light emission distribution and the second light emission distribution by gradually decreasing the discharged light intensities of the light sources for position detection arranged along the two light incident faces simultaneously toward the same side of the arrangement direction. In this case, uniformity in the light emission distribution of the position detection light beams in a direction intersecting the arrangement direction can be increased, whereby the position information regarding the object to be detected in the arrangement direction can be obtained more accurately.

In this case, it is preferable that, by alternately driving two groups of light sources for position detection arranged along the two light incident faces, the light source control unit alternately forms a third light emission distribution tilted toward one side of a direction intersecting the arrangement direction and a fourth light emission distribution tilted toward the other side opposite the one side of the direction intersecting the arrangement direction, and that the position information derivation unit derives position information regarding the object to be detected along the direction intersecting the arrangement direction on the basis of output components of the photosensor respectively attributable to the third light emission distribution and the fourth light emission distribution. With this configuration, by using the same light sources for position detection, both position information regarding the object to be detected along the arrangement direction of the light sources for position detection and position information regarding the object to be detected along the direction intersecting this arrangement direction can be obtained. That is, the obtaining of plan position information regarding the object to be detected can be realized.

Note that, there is a case where the light source control unit forms the first light emission distribution by using a first group of multiple light sources for position detection, among the above-described multiple light sources for position detection, arranged so as to be spaced apart from one another in the arrangement direction and forms the second light emission distribution by using a second group of multiple light sources for position detection different from the first group of light sources for position detection, arranged so as to be spaced apart from one another in the arrangement direction. In addition, there is a case where the light source control unit forms both the first and second light emission distributions by using all of the multiple light sources for position detection. In the former case, the light sources can be controlled easily since the first light emission distribution and the second light emission distribution are formed by different light sources for position detection. In the latter case, the tilts of both light emission distributions can be realized more accurately since the light emission distributions are formed by using all of the light sources for position detection.

An electro-optical device according to a second aspect of the invention includes a light guide plate that is configured to transmit therethrough light beams entering from a light incident face thereof and to emit the light beams from a light emitting face intersecting the light incident face, multiple light sources for position detection that are arranged along the light incident face and that discharge position detection light beams toward the light incident face, a photosensor that detects at least some of position detection light beams reflected by an object to be detected among the position detection light beams emitted from the light emitting face, a light source control unit that switches between a first driving mode and a second driving mode, the first driving mode being a mode in which discharged light intensities of the multiple light sources for position detection are gradually decreased toward one side of an arrangement direction of the multiple light sources for position detection and in which emitted light intensities of the position detection light beams emitted from the light emitting face exhibit a first light emission distribution tilted toward the one side of the arrangement direction, the second driving mode being a mode in which discharged light intensities of the multiple light sources for position detection are gradually decreased toward another side opposite the one side of the arrangement direction and in which emitted light intensities of the position detection light beams emitted from the light emitting face exhibit a second light emission distribution tilted toward the other side of the arrangement direction, a position information derivation unit that derives position information regarding the object to be detected along the arrangement direction on the basis of output components of the photosensor respectively attributable to the first light emission distribution and the second light emission distribution, and an electro-optical panel that has a display area arranged so as to overlap in plan view the light emitting face of the light guide plate.

It is preferable that the display area is arranged at the light emitting side of the light emitting face with respect to the light guide plate, that the electro-optical device further includes multiple light sources for lighting that discharge illumination light beams toward the light incident face of the light guide plate, and that the multiple light sources for lighting are arranged, together with the multiple light sources for position detection, so as to be spaced apart from one another along the light incident face. With this configuration, the display area of the electro-optical device arranged at the light emitting side of the light guide plate can be illuminated since the multiple light sources for lighting are arranged so as to be spaced apart from one another along the light incident face and thus the light emitting face also emits the illumination light beams concurrently. Therefore, both the position detection function and the illumination function can be realized by using a common light guide plate, whereby the number of parts can be reduced and a compact electro-optical device can be realized.

In this case, the light guide plate has a planar shape having multiple sides on which the light incident face is located, and the light incident face that the position detection light beams enter and the light incident face that the illumination light beams enter are located on different sides. In this case, as with the above-described embodiment, both the position detection function and the illumination function can be realized by using a common light guide plate, whereby the number of parts can be reduced and a compact electro-optical device can be realized. Additionally, in this case, since the light incident face that the position detection light beams enter and the light incident face that the illumination light beams enter are located at the different sides of the light guide plate, the light sources for position detection and the light sources for lighting can be arranged freely in accordance with light distribution properties required thereby. Especially in the case where the shape of the light guide plate in plan view is rectangular, it is preferable that the light incident face on which the multiple light sources for position detection are arranged and the light incident face on which the multiple light sources for lighting are arranged are located on sides adjacent to each other. In this case, since the illumination light beams and the position detection light beams are transmitted in different directions through the inside of the light guide plate, light guiding properties of the light guide plate for the illumination light beams and for the position detection light beams can be designed separately. In particular, as described later, it is preferable that the multiple light sources for position detection are arranged along shorter sides and the multiple light sources for lighting are arranged along longer sides.

It is also preferable that the display area is arranged at the light emitting side of the light emitting face with respect to the light guide plate, that the electro-optical device further includes multiple light sources for lighting that discharge illumination light beams toward a face of the light guide plate at the opposite side from the light emitting face, and that the multiple light sources for lighting are arranged so as to be spaced apart from one another in an area overlapped in plan view with the light emitting face. In this case, so-called a direct-lighting illumination structure is provided, and the illumination light beams discharged from the light sources for lighting arranged so as to be spaced apart from one another in the area overlapped in plan view with the light emitting face pass through the light guide plate and illuminate the display area of the electro-optical panel.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail with reference to the accompanying drawings.

First Embodiment

Figure 1:
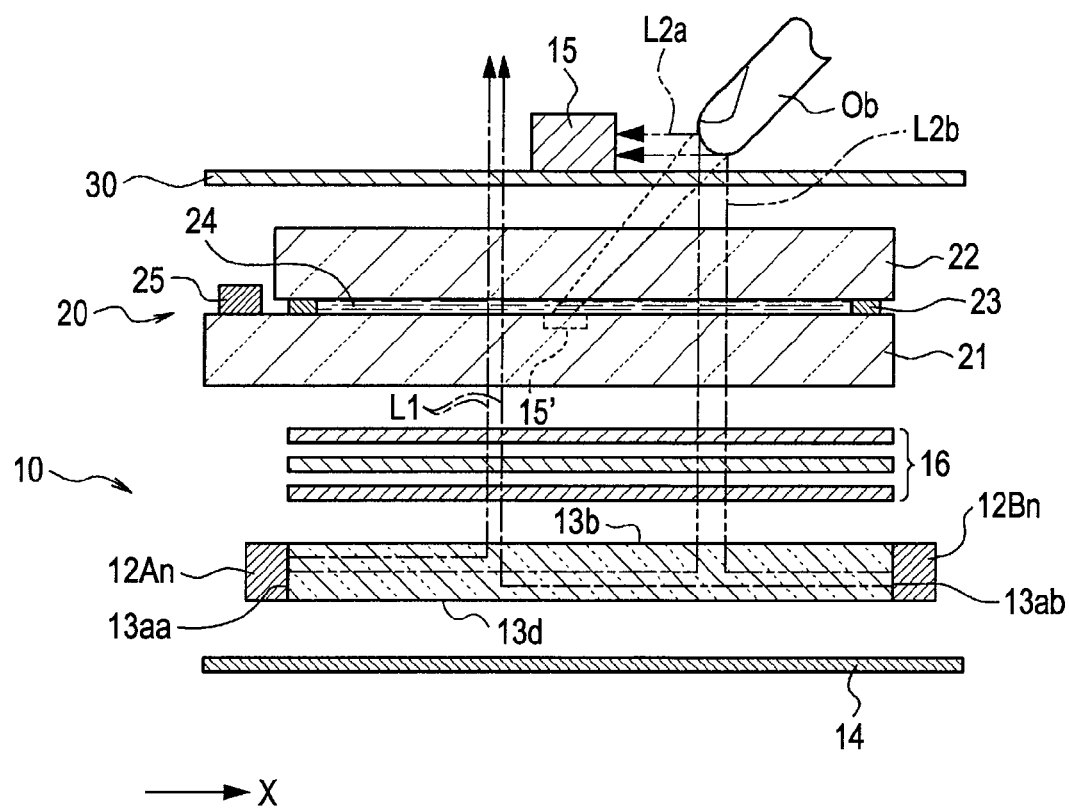
FIG. 1 is a schematic sectional view schematically illustrating a schematic configuration of a position detecting device and an electro-optical device of a first embodiment.
Figure 2:
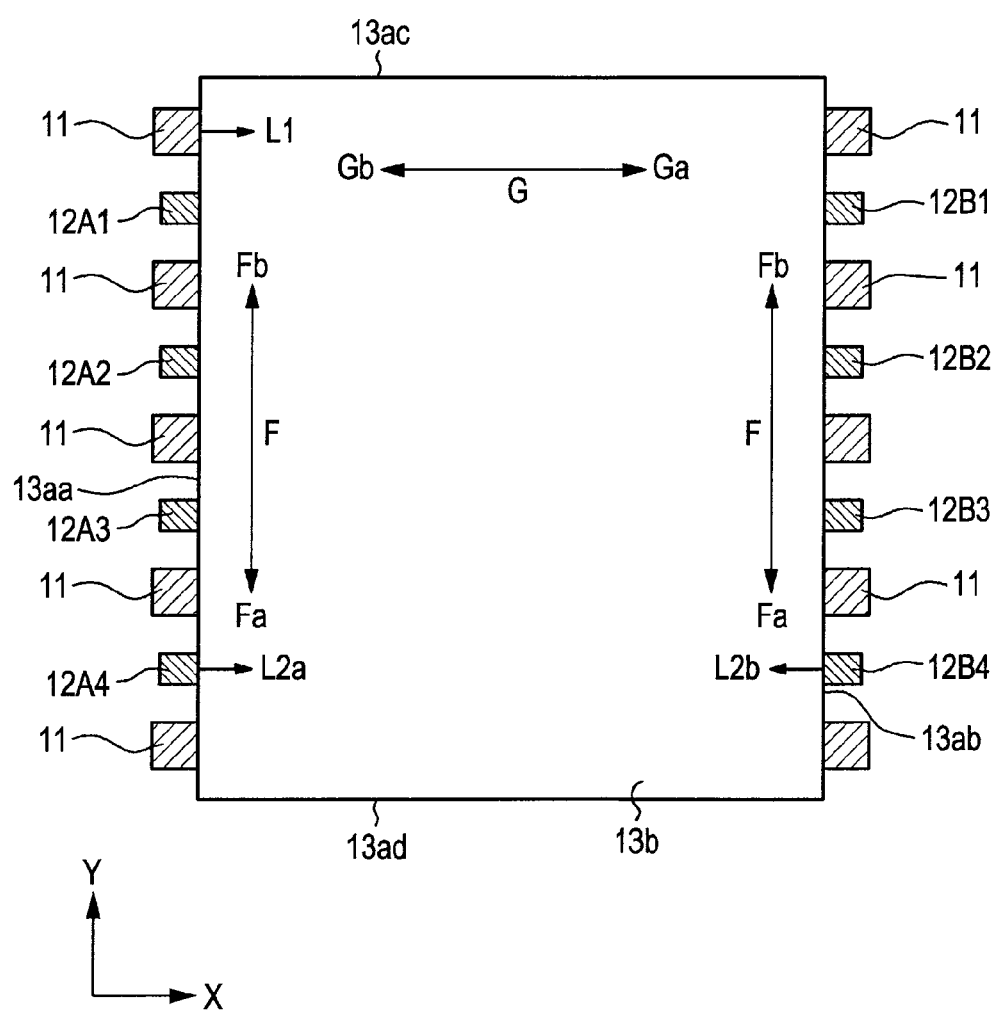
FIG. 2 is a schematic rear view illustrating an arrangement of a light guide plate, light sources for position detection, and light sources for lighting of the first embodiment.

FIG. 1 is a schematic sectional view schematically illustrating a configuration of a lighting device and an electro-optical device (position detecting device) according to a first embodiment of the invention. FIG. 2 is a rear view schematically illustrating light sources and a light guide plate of the lighting device viewed from the rear side.

A lighting device 10 of the present embodiment includes light sources for lighting 11 that each emit an illumination light beam L1, light sources for position detection 12A1, 12A2, 12A3, and 12A4 (hereinafter simply referred to as a light source for position detection 12An (n=1, k; k is a natural number of 2 or more)) that emit position detection light beams L2a, light sources for position detection 12B1, 12B2, 12B3 and 12B4 (hereinafter simply referred to as a light source for position detection 12Bn (n=1, . . . k; k is a natural number of 2 or more)) that emit position detection light beams L2b, a light guide plate 13 that the illumination light beams L1 and the position detection light beams L2a and L2b enter, a reflection plate 14 that is arranged behind the light guide plate 13, and a photosensor 15 that is arranged at the side to which the position detection light beams L2a and L2b are emitted. Thus, the position detecting device is formed. The light guide plate 13 is composed of a transparent light guiding material such as an acrylic resin or a polycarbonate resin. The light guide plate 13 has a first light incident face 13aa which is an end face of one side of the light guide plate 13, a second light incident face 13ab which is an end face of another side of the light guide plate 13 facing the light incident face 13aa, end faces 13ac and 13ad of the sides between the light incident faces 13aa and 13ab, a light emitting face 13b which is adjacent to and intersects (in the figure, perpendicular to) the end faces, and a back face 13d located at the opposite side from the light emitting face 13b. Furthermore, if needed, optical sheets 16 such as light diffusing plates that uniformly diffuse illumination light beams or light collecting plates, such as prism sheets, that increase the directivity of illumination light beams are appropriately arranged at the light emitting side of the light guide plate 13.

An electro-optical panel 20 formed of a transmissive liquid crystal display body or the like is arranged at the light emitting side of the lighting device 10. This electro-optical panel 20 is provided with transparent substrates 21 and 22 bonded together with a sealing member 23, and liquid crystal 24 arranged therebetween. Multiple pixels in which the orientation of molecules of the liquid crystal 24 can be controlled by electrodes (not shown) are further provided. If needed, polarizing plates (not shown) are arranged at the outer side of the substrates 21 and 22. Each of the pixels is driven by driving signals output by a driving circuit 25 formed of a semiconductor integrated circuit (IC) chip or the like, and is controlled so as to obtain a predetermined transmissive state for the pixel.

A cover plate 30 that is light transmissive is arranged at the opposite side of the electro-optical panel 20 from the light guide plate 13. The photosensor 15 is arranged on the outer face of this cover plate 30 (the face at the opposite side from the electro-optical panel 20). This photosensor 15 is a light-receiving device such as a photodiode and is configured so as to detect the intensities of the position detection light beams L2a and L2b. For example, in the case where the position detection light beams L2a and L2b are infrared light, as described later, the photosensor 15 is then formed of a light-receiving device having sensitivity to infrared light. Note that although it is sufficient to provide at least one photosensor 15, multiple photosensors 15 may be provided instead. In addition, the photosensor 15 may be arranged at a location other than on the outermost surface such as on the cover plate 30 as in the illustrated example. For example, a photosensor 15' may be provided inside the electro-optical panel 20. Basically, it is sufficient to mount the photosensor 15 in such a configuration that at least some of the reflected light beams of the position detection light beams L2a and L2b from an object to be detected Ob (to be described later) can be detected.

Each of the light sources for lighting 11 is formed of an illuminating device such as a light-emitting diode (LED) and discharges the illumination light beam L1 of, for example, white color in accordance with driving signals output from a driving circuit (not shown). As illustrated in FIG. 2, multiple light sources for lighting 11 are arranged along the two light incident faces 13aa and 13ab, which face each other with the light emitting face 13b of the light guide plate 13 therebetween.

The light sources for position detection 12An and 12Bn are formed of illuminating devices such as LEDs, and respectively discharge the position detection light beams L2a and L2b, which are, for example, infrared light in accordance with driving signals output from a driving circuit (not shown). The position detection light beams L2a and L2b may be of any known type, and preferably are light beams that can be detected while being distinguished from the illumination light beam L1 and outside light beams by signal processing or the like (to be described later). It is preferable that the position detection light beams L2a and L2b are different from the illumination light beam L1 in terms of wavelength distribution and illumination. In addition, it is preferable that the position detection light beams L2a and L2b have a wavelength region for being effectively reflected by the object to be detected Ob according to the invention. For example, in the case where the object to be detected Ob is a part of a human body such as a finger, it is preferable that the position detection light beams L2a and L2b are infrared light which has a high reflectance at the surface of a human body (in particular, near-infrared light near the visible spectrum). A plurality of light sources for position detection 12An and a plurality of light sources for position detection 12Bn are essentially provided and configured so as to discharge the respective position detection light beams L2a and L2b from positions different from one another.

As illustrated in FIG. 2, the light guide plate 13 is formed into a rectangular shape in plan view. The first light incident face 13aa and the second light incident face 13ab are respectively located on the sides facing each other of the light guide plate 13. On the first light incident face 13aa, the multiple light sources for lighting 11 and the multiple light sources for position detection 12An are arranged along the side thereof in an arrangement direction F. The illumination light beams L1 and the position detection light beams L2a enter the inside of the light guide plate 13 from the first light incident face 13aa and are transmitted through the inside toward the second light incident face 13ab located at the opposite side. In this case, the multiple light sources for lighting 11 and the multiple light sources for position detection 12An are arranged so as to be spaced apart from one another along the light incident face 13aa. In the illustrated example, the light sources for lighting 11 and the light sources for position detection 12An are alternately arranged along the light incident face 13aa. However, in the case where the number of light sources for lighting 11 differs greatly from the number of light sources for position detection 12An, the light sources 11 and 12An may be arranged in such a way that one light source of the light sources provided in a smaller number is arranged every several light sources of the light sources provided in a greater number.

Likewise, the multiple light sources for lighting 11 and the multiple light sources for position detection 12Bn are arranged along the side of the second light incident face 13ab in the arrangement direction F. The illumination light beams L1 and the position detection light beams L2b enter the inside of the light guide plate 13 from the second light incident face 13ab and are transmitted through the inside toward the first light incident face 13aa located at the opposite side. In this case, the multiple light sources for lighting 11 and the multiple light sources for position detection 12Bn are arranged so as to be spaced apart from one another along the light incident face 13*ab*. In the illustrated example, the light sources for lighting 11 and the light sources for position detection 12Bn are alternately arranged along the light incident face 13*ab*. However, in the case where the number of light sources for lighting 11 differs greatly from the number of light sources for position detection 12Bn, the light sources 11 and 12Bn may be arranged in such a way that one light source of the light sources provided in a smaller number is arranged every several light sources of the light sources provided in a greater number. Note that it is preferable that the arrangement of the light sources for lighting 11 and the light sources for position detection 12An along the light incident face 13*aa* and the arrangement of the light sources for lighting 11 and the light sources for position detection 12Bn along the light incident face 13*ab* are configured so as to be symmetrical to each other.

In the lighting device 10 of the present embodiment, the illumination light beams L1 discharged from the light sources for lighting 11 to the light incident face 13*aa* or 13*ab* enter the inside of the light guide plate 13 and, while being transmitted through the inside of the light guide plate 13 along the light emitting face 13*b* toward one side Ga or the other side Gb of a perpendicular direction G which is perpendicular to the arrangement direction F, the illumination light beams L1 are emitted little by little from the light emitting face 13*b*. In order to configure the light guide plate 13 so that the illumination light beams L1 entering from the light incident faces 13*aa* and 13*ab* are emitted little by little from the light emitting face 13*b* while being transmitted through the inside, the light guide plate 13 is provided with a light scattering structure such as fine irregular patterns or a printed layer formed on the light emitting face 13*b* or the back face 13*d*. The pattern distribution and the distribution density of this light scattering structure are appropriately adjusted so that a uniform light emission distribution having a substantially uniform luminance of the illumination light beams L1 inside the light emitting face 13*b* can be obtained. For example, in the case of the illustrated example, the light scattering structure is formed such that the degree of scattering thereby increases gradually from the light incident faces 13*aa* and 13*ab* toward the midpoint therebetween.

As described above, the illumination light beams L1 emitted from the light emitting face 13*b* pass through the optical sheets 16 and illuminate a display area of the electro-optical panel 20. Thus, a predetermined image is formed by light modulation of the display area and the image becomes visible from the viewing side (upper side in FIG. 1).

On the other hand, the position detection light beams L2*a* discharged from the light sources for position detection 12An to the light incident face 13*aa* enter the inside of the light guide plate 13 and, while being transmitted through the inside of the light guide plate 13 along the light emitting face 13*b* toward the one side Ga of the perpendicular direction G perpendicular to the arrangement direction F, the position detection light beams L2*a* are emitted little by little from the light emitting face 13*b*. In this case, the light emission distribution of the position detection light beams L2*a* emitted from the light emitting face 13*b* shows a gradual decrease in the emitted light intensity as the distance from the first light incident face 13*aa* increases, thus showing the distribution tilted toward the one side Ga of the perpendicular direction G. The distribution of the position detection light beams L2*a* emitted from the light emitting face 13*b* is illustrated as a third light emission distribution D3 in FIG. 3.

The position detection light beams L2*b* discharged from the light sources for position detection 12Bn to the light incident face 13*ab* also enter the inside of the light guide plate 13 and, while being transmitted through the inside of the light guide plate 13 along the light emitting face 13*b* toward the other side Gb of the perpendicular direction G opposite from the one side Ga, the position detection light beams L2*b* are emitted little by little from the light emitting face 13*b*. In this case, the light emission distribution of the position detection light beams L2*b* emitted from the light emitting face 13*b* shows a gradual decrease in the emitted light intensity as the distance from the second light incident face 13*ab* increases, thus showing the distribution decreasing tilted toward the other side Gb of the perpendicular direction G. The distribution of the position detection light beams L2*b* emitted from the light emitting face 13*b* is illustrated as a fourth light emission distribution D4 in FIG. 3.

In this case, as described above, the light guide plate 13 has a predetermined light scattering structure in order to increase uniformity in the light emission distribution of the illumination light beams L1 emitted from the light emitting face 13*b*. This light scattering structure is configured so as to increase uniformity in the light emission distribution when the illumination light beams L1 enter the inside of the light guide plate 13 from both of the two light incident faces 13*aa* and 13*ab* facing each other. As for the position detection light beams L2*a* and L2*b* respectively entering from the light incident faces 13*aa* and 13*ab*, the intensity of the light beams emitted from the light emitting face 13*b* gradually decreases as the distance from the corresponding light incident face 13*aa* or 13*ab* increases. This decrease in the emitted light intensity is caused not only by decrease in the intensity of the internally transmitted light beams due to emission of the light beams from the light emitting face 13*b* of the light guide plate 13 but also by attenuation of the position detection light beams L2*a* and L2*b* being transmitted inside the light guide plate 13. However, in the case where, although the illumination light beams L1 are basically visible light (white light), the position detection light beams L2*a* and L2*b* are infrared light, the scattering rate of light of the light scattering structure differs depending on the wavelength (the longer the wavelength, the less scattered light), and thus the degree of scattering of the position detection light beams L2*a* and L2*b* by the light scattering structure is normally lower than that of the illumination light beams L1. That is, the position detection light beams L2*a* and L2*b* are less likely to be emitted from the light emitting face 13*b* and, as a result, the degree of the decrease in the emitted light intensity in a direction away from the light incident face 13*aa* and 13*ab* becomes smaller.

Figure 4:
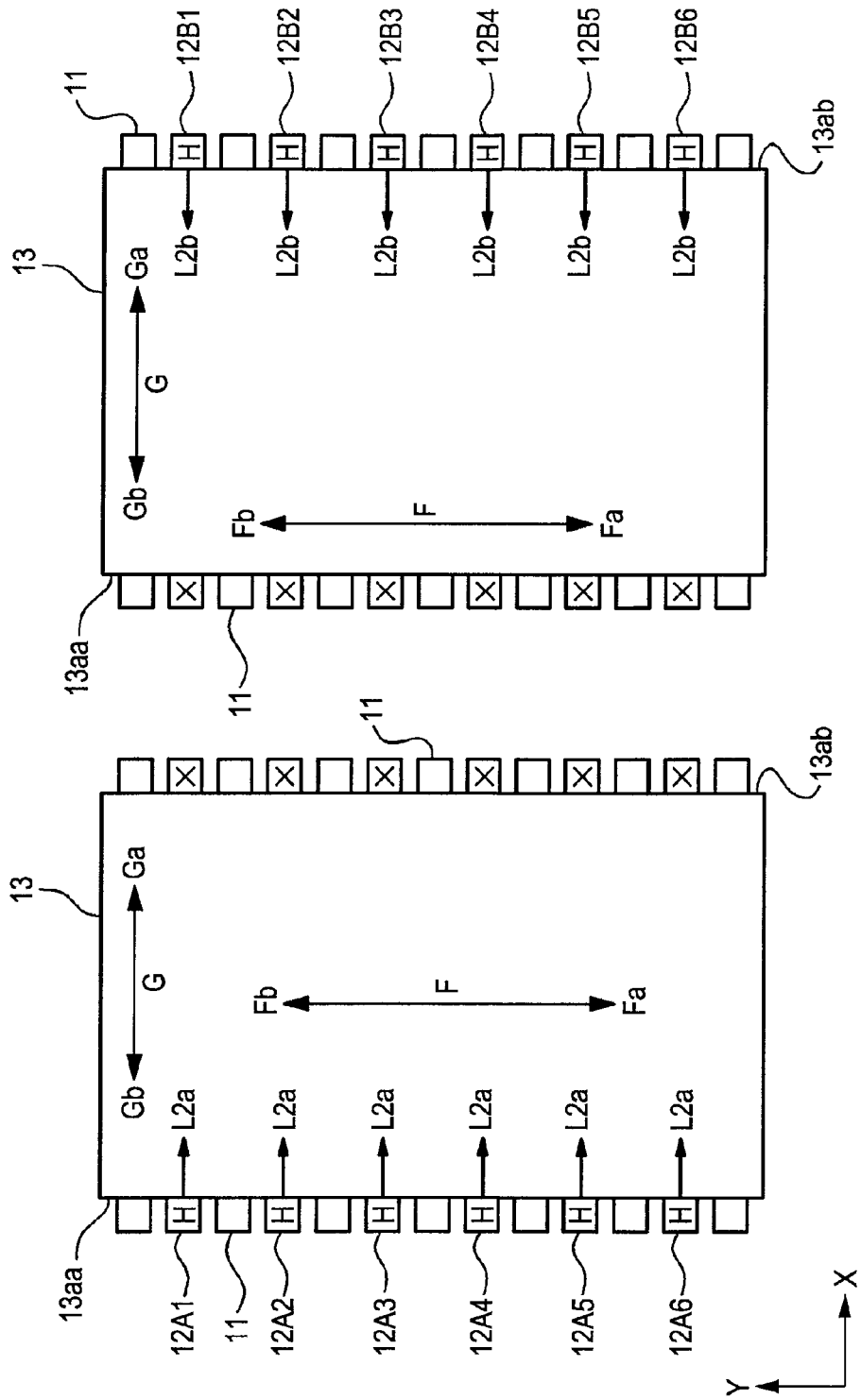
FIG. 4A is a rear view illustrating a way in which light sources for position detection for forming the third light emission distribution illuminate in the first embodiment.
FIG. 4B is a rear view illustrating a way in which light sources for position detection for forming the fourth light emission distribution illuminate in the first embodiment.

In the present embodiment, the third light emission distribution D3 is formed when multiple light sources for position detection 12An arranged in the arrangement direction F along the light incident face 13*aa* are turned on (indicated by H in the figure) as illustrated in FIG. 4A, and the fourth light emission distribution D4 is formed when multiple light sources for position detection 12Bn arranged in the arrangement direction F along the light incident face 13*ab* are turned on (indicated by H in the figure) as illustrated in FIG. 4B. Since the third light emission distribution D3 is a distribution tilted toward the one side Ga of the perpendicular direction G, the reflected light intensity of the position detection light beams L2*a* varies in accordance with the position of the object to be detected Ob in the X direction illustrated in the figure, and the output component of the photosensor 15 also varies in accordance with the position of the object to be detected Ob in the X direction. Similarly, since the fourth light emission distribution D4 is a distribution tilted toward the other side Gb of the perpendicular direction G, the reflected light intensity of the position detection light beams L2b varies in accordance with the position of the object to be detected Ob in the X direction illustrated in the figure, and the output component of the photosensor 15 also varies in accordance with the position of the object to be detected Ob.

Next, a method for obtaining position information regarding the object to be detected Ob on the basis of the detection of the position detection light beams L2a and L2b by the photosensor 15 will be described. Various methods for obtaining such position information may be conceivable. Methods, for example, include a method in which, on the basis of the ratio of detected light intensities of two position detection light beams L2a and L2b, the ratio of their attenuation coefficients is determined, and then, by determining the transmission distances of the position detection light beams L2a and L2b from the ratio of the attenuation coefficients, the positional coordinates of the object to be detected Ob in a direction connecting two corresponding light sources for position detection 12An and 12Bn are determined.

A specific description will be given for the case where the positional coordinates of the object to be detected Ob in the X direction (corresponding to the perpendicular direction G) are determined by using a first group of light sources for position detection 12An and a second group of light sources for position detection 12Bn respectively arranged along the light incident faces 13aa and 13ab facing each other. When a control amount (e.g. an amount of current), a transformation coefficient, and a discharged light intensity of the first group of light sources for position detection 12A are respectively indicated as Ia, k, and Ea, and a control amount (e.g. an amount of current), a transformation coefficient, and a discharged light intensity of the second group of light sources for position detection 12B are respectively indicated as Ib, k, and Eb, the following formulas (1) and (2) are valid.

$$Ea = k \cdot Ia \quad (1)$$

$$Eb = k \cdot Ib \quad (2)$$

In addition, when an attenuation coefficient and a detected light intensity of a first group of position detection light beams L2a are respectively indicated as fa and Ha, and an attenuation coefficient and a detected light intensity of a second group of position detection light beams L2b are respectively indicated as fb and Hb, the following formulas (3) and (4) are valid.

$$Ha = fa\{fourth\ root\}Ea = fa \cdot k \cdot Ia \quad (3)$$

$$Hb = fb \cdot Eb = fb \cdot k \cdot Ib \quad (4)$$

Therefore, if Ha/Hb, which is the ratio of the detected light intensities of the position detection light beams L2a and L2b, can be detected by using the ratio of the output components of the photosensor 15 respectively attributable to the light emission distributions D3 and D4, the formula Ha/Hb=(fa·Ea)/(fb·Eb)=(fa/fb)·(Ia/Ib) is obtained, whereby the ratio of the attenuation coefficients fa/fb can be determined by using the following formula (5) when a value corresponding to the ratio of the discharged light intensities Ea/Eb or the ratio of the control amounts Ia/Ib is obtained.

$$fa/fb = (Ha/Hb) \cdot (Ib/Ia) \quad (5)$$

Figure 3:
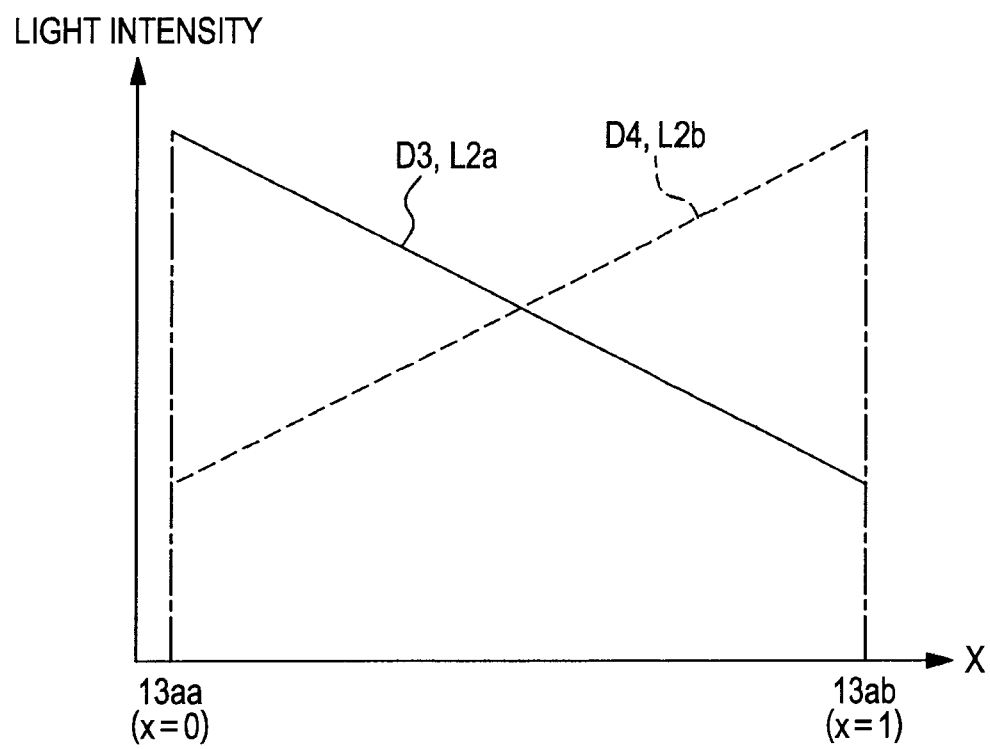
FIG. 3 is an explanatory diagram illustrating a third light emission distribution and a fourth light emission distribution of the first embodiment.

Since the attenuation coefficients fa and fb are respectively the ratio of the light intensity of the position detection light beams L2a detected by the photosensor 15 (detected light intensity or output component) to the light intensity of the position detection light beams L2a discharged from the light sources for position detection 12An (discharged light intensity) and the ratio of the light intensity of the position detection light beams L2b detected by the photosensor 15 to the light intensity of the position detection light beams L2b discharged from the light sources for position detection 12Bn, the attenuation coefficients fa and fb vary depending on the position of the object to be detected Ob on the X coordinate in accordance with the tilts of the third light emission distribution D3 and the fourth light emission distribution D4 illustrated in FIG. 3. In this case, if a relative coordinate system having x=0 as the origin at the light incident face 13aa side and x=1 as the maximum value at the light incident face 13ab side is used as the X coordinate on the light emitting face 13b, the ratio of the attenuation coefficients fa/fb have a positive correlation with (1−x)/x with respect to the coordinate x of the object to be detected Ob in the X direction. In any case, if the above-described correlation is set in advance, the value of the coordinate x which is the position information regarding the object to be detected Ob (the positional coordinate in the direction from the first group of light source for position detection 12An toward the second group of light source for position detection 12Bn) can be obtained on the basis of the ratio of the attenuation coefficients fa/fb.

To determine the ratio of the attenuation coefficients fa/fb, it is necessary to discriminate between the position detection light beams L2a and L2b to obtain the ratio of the detected light intensities Ha/Hb. As a method for this, there is a method, for example, in which the first group of light sources for position detection 12An and the second group of light sources for position detection 12Bn are flashed in reverse phase (for example, by operating driving signals having a rectangular waveform or a sinusoidal waveform at such a frequency that a phase difference due to a difference in transmission distance can be ignored, in such a manner that a phase difference of 180 degrees between the driving signals can be obtained), and waveforms of the detected light intensities are analyzed in terms of phase. That is, the third light emission distribution D3 and the fourth light emission distribution D4 are alternately formed by controlling the light sources for position detection 12An and 12Bn, and a certain process is performed on the basis of detection signals of the photosensor 15 which are output correspondingly.

Figure 13:
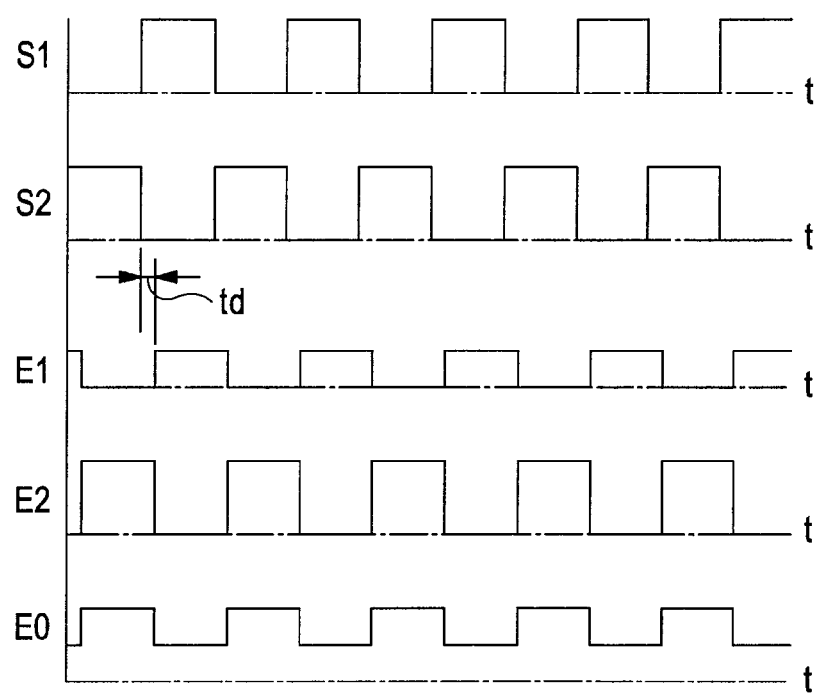
FIG. 13 is a timing chart illustrating illumination timings of light sources for position detection and detection timings of a photosensor in the embodiments.

FIG. 13 is a timing chart indicating a control signal S1 for the light sources for position detection 12An, a control signal S2 for the light sources for position detection 12Bn, and a detection signal E0 of the photosensor 15. In the illustrated example, the above-mentioned control signals S1 and S2 are rectangular waves in reverse phase with respect to each other, and therefore the timings of illumination of the position detection light beams L2a and L2b are also in reverse phase. The detection signal E0 of the photosensor 15 is the sum of the detection component E1 (output component attributable to the third light emission distribution D3) of the position detection light beams L2a and the detection component E2 (output component attributable to the fourth light emission distribution D4) of the position detection light beams L2b, the detection components E1 and E2 being responses having a proper delay td with respect to the respective control signals S1 and S2.

The detection signal E0 is analyzed in synchronization with a clock signal forming the control signals S1 and S2. In this case, the ratio of the detected light intensities Ha/Hb can be determined by deriving, from the detection signal E0, an amplitude of the detection component E1 obtained in a phase corresponding to the phase of the control signal S1 and an amplitude of the detection component E2 obtained in a phase corresponding to the phase of the control signal S2. Then, the ratio of the attenuation coefficients fa/fb is calculated using the formula (5) and, on the basis of this, the X coordinate of the object to be detected Ob can be determined. The circuit configuration for this case is illustrated in FIG. 15.

Figure 15:
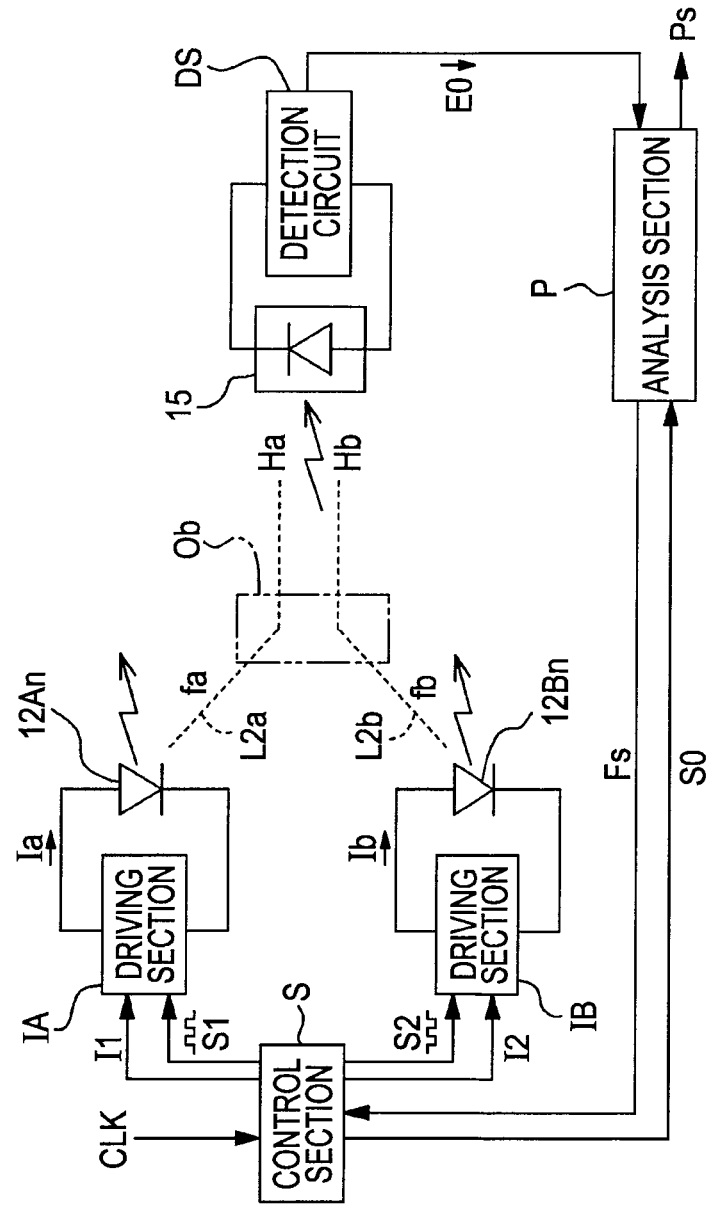
FIG. 15 is a schematic configuration block diagram illustrating a principle of detection of position information in the embodiments.

As illustrated in FIG. 15, a control section S that operates in accordance with a clock signal CLK outputs the control signals S1 and S2 and driving set signals I1 and I2 to driving sections IA and IB. On the basis of these signals, the driving sections IA and IB respectively drive the light sources for position detection 12An and 12Bn with current values Ia and Ib. The photosensor 15 outputs the detection signal EU by using a detection circuit DS, and this detection signal E0 is analyzed in an analysis section P. The analysis section P analyzes the detection signal E0 on the basis of a synchronization signal S0 output from the control section S and, on the basis of the derived ratio Ha/Hb and the current values Ia and Ib, eventually outputs the ratio of attenuation coefficients fa/fb or an output signal Ps that corresponds to the coordinate x.

However, the calculation of the X coordinate of the object to be detected Ob based on the formula (5) after the analysis of the detection signal E0 is not limited to the above-described method. For example, the ratio of the attenuation coefficients fa/fb can be derived from the control amount Ib=Im·(fa/fb) by fixing one control amount Ia to a constant value Im and controlling the other control amount Ib so that observation of changes in detection waveforms is disabled (that is, so that the ratio of the detected light intensities Ha/Hb can equal one). In this case, a feedback signal Fs corresponding to the ratio of the detected light intensities Ha/Hb is fed back to the control section S from the analysis section P, and the driving set signal I2 to be output from the control section S is changed in accordance with the value of this feedback signal Fs to control the current value Ib in such a manner that Ha/Hb=1 can be obtained.

Furthermore, the control may be performed in such a manner that Ha/Hb=1 can be obtained while constantly maintaining the sum of both control amounts to a constant value (Im=Ia+Ib). In this case, an equation Ib=Im·fb/(fa+fb) can be derived from the formula (5), and thus if an equation fb/(fa+fb)=α is assigned, the ratio of attenuation coefficients is determined by using fa/fb=(1−α)/α.

Figure 5:
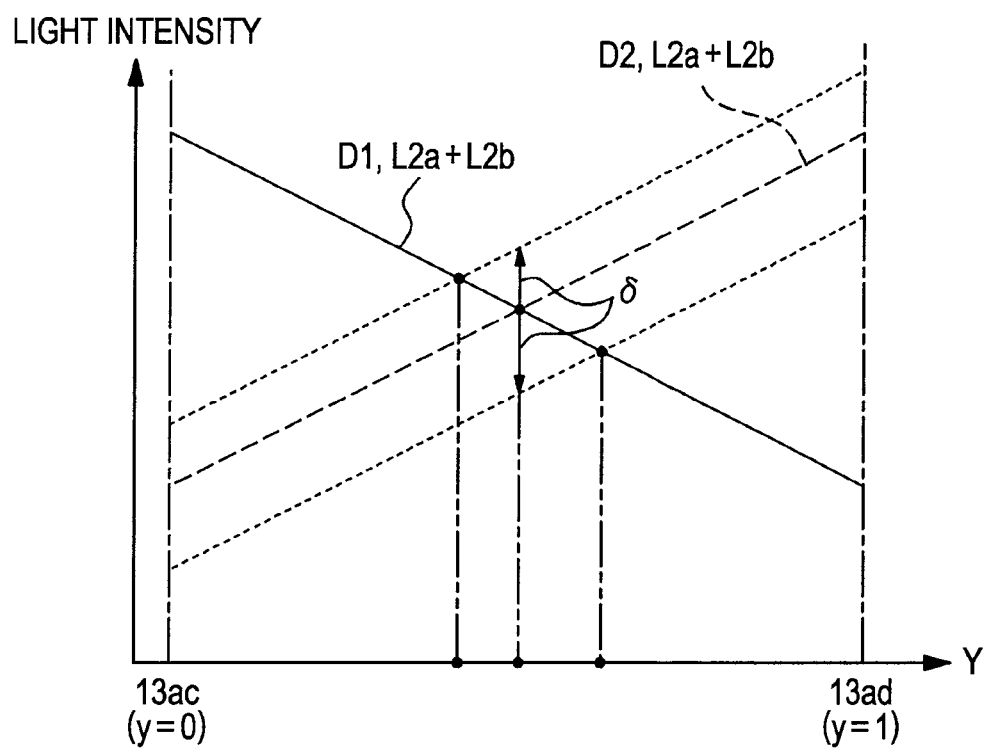
FIG. 5 is an explanatory diagram illustrating a first light emission distribution and a second light emission distribution of the first embodiment.

In the case of the present embodiment, although the position information regarding the object to be detected Ob in the X direction illustrated in the figures can be obtained by driving the first group of light sources for position detection 12An and the second group of light sources for position detection 12Bn in reverse phase with respect to each other as described above, it is necessary to further obtain the position information in the Y direction perpendicular to the X direction in order to detect the plan position of the object to be detected Ob. The position information regarding the object to be detected Ob in the Y direction is obtained, by monotonically changing the discharged light intensities Ea and Eb of the light sources for position detection 12An and 12Bn along the arrangement direction F to form the first light emission distribution D1 and the second light emission distribution D2 illustrated in FIG. 5, on the basis of the detection signals of the photosensor 15 obtained from the light emission distributions D1 and D2. In this case, in FIG. 5, a relative coordinate system having y=0 as the origin at the end face 13ac side and y=1 as the maximum value at the end face 13ad side is introduced as the position coordinate in the Y coordinate.

Figure 6:
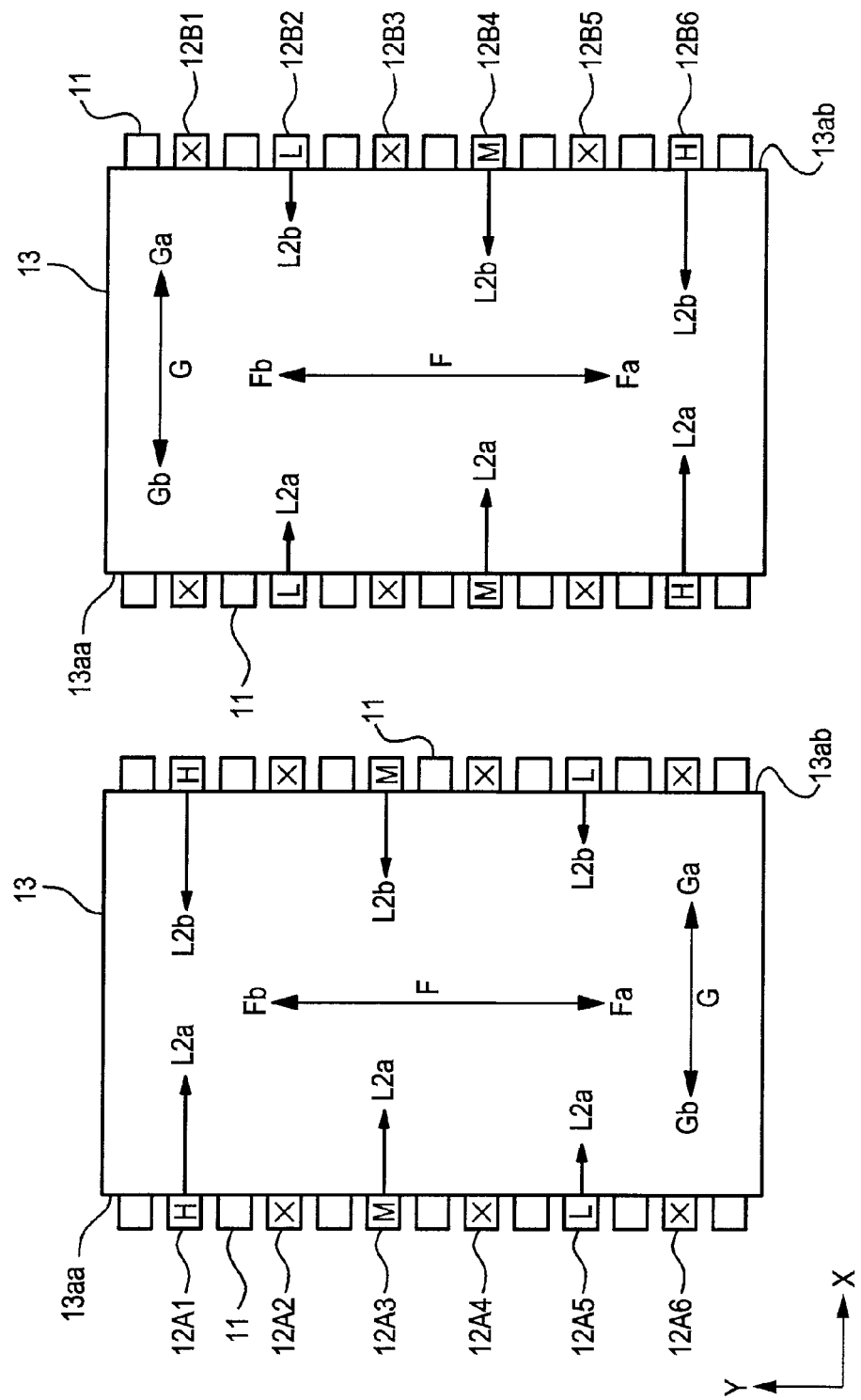
FIG. 6A is a rear view illustrating a way in which light sources for position detection for forming the first light emission distribution illuminate in the first embodiment.
FIG. 6B is a rear view illustrating a way in which light sources for position detection for forming the second light emission distribution illuminate in the first embodiment.
Figure 14A:
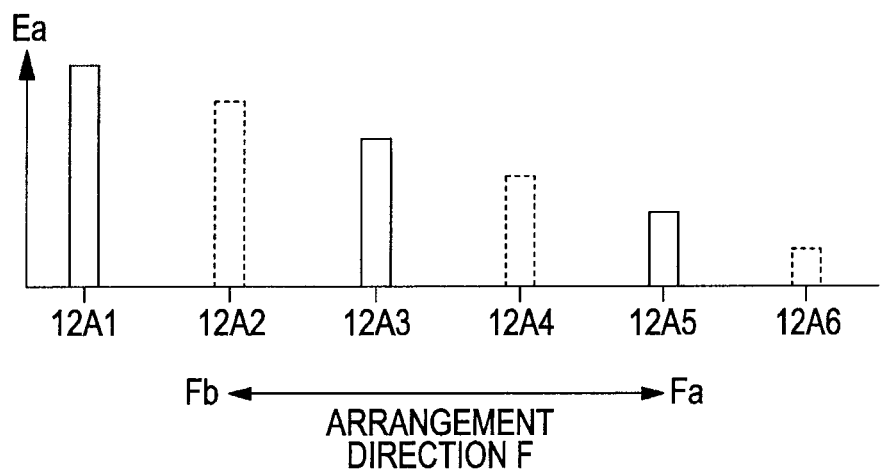
FIGS. 14A and 14B are graphs illustrating two patterns of illumination of multiple light sources for position detection in accordance with arrangement thereof in the embodiments.

Examples for forming the first light emission distribution D1 and the second light emission distribution D2 in the present embodiment are respectively illustrated in FIGS. 6A and 6B. In FIG. 6A, six light sources for position detection 12An and six light sources for position detection 12Bn are arranged. Among these light sources for position detection 12A1 to 12A6 and 12B1 to 12B6, a first group of light sources for position detection 12A1, 12A3, 12A5, 12B1, 12B3, and 12B5, each of which is arranged every other light source arranged in the arrangement direction F, is driven so that the discharged light intensities Ea and Eb gradually decrease toward one side Fa of the arrangement direction F (in the figure, H, M, and L are indicated in the order from the highest discharged light intensity). That is, as illustrated in FIG. 14A, the light sources for position detection 12A1, 12A3, and 12A5 belonging to the first group are illuminated in such a way that the discharged light intensities Ea are sequentially reduced toward the one side Fa of the arrangement direction F. Here, although only the discharged light intensities Ea of the light sources for position detection 12An are illustrated, the same is applied to the discharged light intensities Eb of the light sources for position detection 12Bn. Therefore, the emitted light intensity of the position detection light beams L2a and L2b emitted from the light emitting face 13b of the light guide plate 13 gradually decreases toward the one side Fa of the arrangement direction F, and thus the first light emission distribution D1 tilted toward the negative side in the Y direction is formed.

Figure 14B:
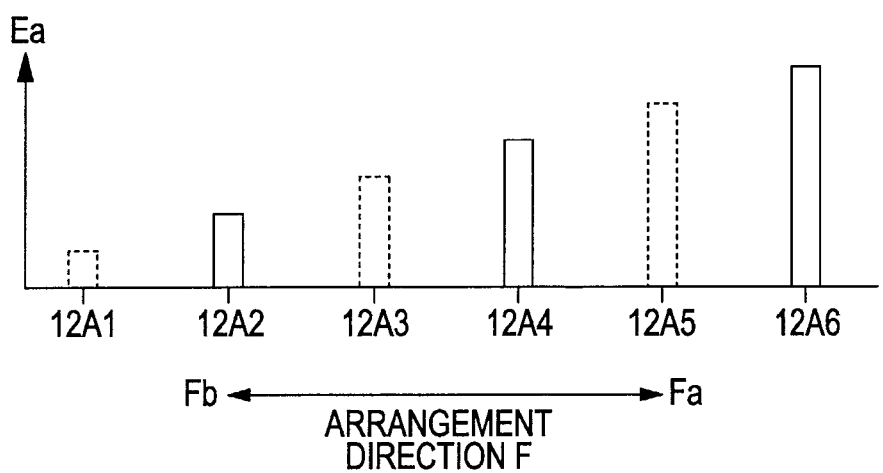

On the other hand, in FIG. 6B, among these light sources for position detection 12A1 to 12A6 and 12B1 to 12B6, a second group of light sources for position detection 12A2, 12A4, 12A6, 12B2, 12B4, and 12B6, which are other than the first group of light sources for position detection 12A1, 12A3, 12A5, 12B1, 12B3, and 12B5 arranged in the arrangement direction F, is driven so that the discharged light intensities Ea and Eb gradually decrease toward the other side Fb of the arrangement direction F opposite from the one side Fa (in the figure, H, M, and L are indicated in the order from the highest discharged light intensity). That is, as illustrated in FIG. 14B, the light sources for position detection 12A2, 12A4, and 12A6 belonging to the second group are illuminated in such a way that the discharged light intensities Ea are sequentially reduced toward the other side Fb of the arrangement direction F. Here, although only the discharged light intensities Ea of the light sources for position detection 12An are illustrated, the same is applied to the discharged light intensities Eb of the light sources for position detection 12Bn. Therefore, the emitted light intensity of the position detection light beams L2a and L2b emitted from the light emitting face 13b of the light guide plate 13 gradually decreases toward the other side Fb of the arrangement direction F, and thus the second light emission distribution D2 tilted toward the positive side in the Y direction is formed.

As with the method for obtaining the position information in the X direction described above with reference to FIGS. 13 and 15, the ratio of the detected light intensities based on the respective light emission distributions D1 and D2 is determined by alternately turning on the first group of light sources for position detection 12A1, 12A3, 12A5, 12B1, 12B3, and 12B5, and the second group of light sources for position detection 12A2, 12A4, 12A6, 12B2, 12B4, and 12B6 to alternately form the first light emission distribution D1 and the second light emission distribution D2, and analyzing the detection signals of the photosensor 15 in terms of phase. With the sequential processes, which are the same as those of the method described above, the coordinate y of the object to be detected Ob in the Y direction can be eventually derived.

Figure 16:
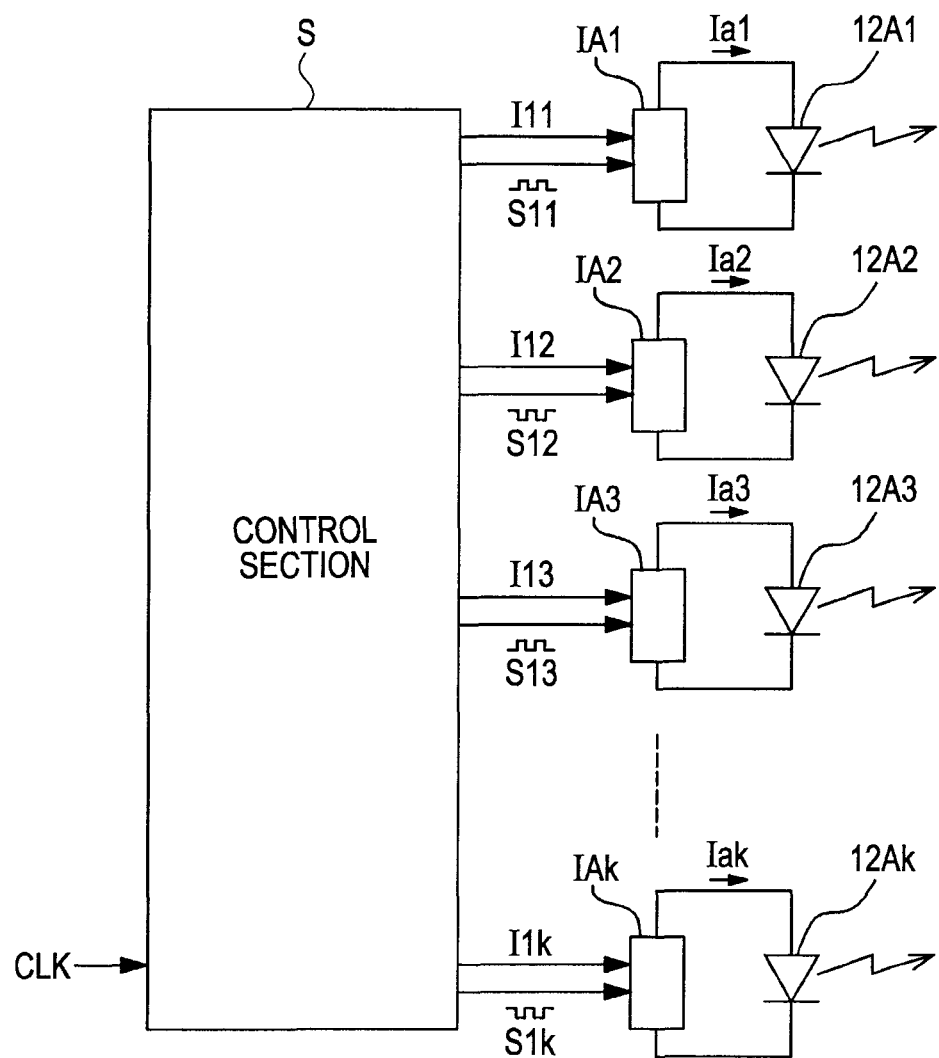
FIG. 16 is a schematic configuration block diagram illustrating a configuration for driving multiple light sources for position detection in the embodiments.

As described above, in order to derive the coordinate y of the object to be detected Ob in the Y direction, it is necessary that the discharged light intensities Ea and Eb of the first group and second group of light sources for position detection 12A1, 12A3, 12A5, 12B1, 12B3 and 12B5, and 12A2, 12A4, 12A6, 12B2, 12B4 and 12B6 are gradually decreased respectively toward the one side Fa and the other side Fb of the arrangement direction F. Therefore, as illustrated in FIG. 16, a driving configuration is configured so that current values Ia1, Ia2, Ia3, . . . , Iak which are the respective control amounts of the light sources for position detection 12An (n=1 to k; k=6 for FIG. 4) can be set to different values by using driving sections IA1, IA2, IA3, . . . , I1k, each of which is similar to the above-described driving section IA, on the basis of driving set signals I11, I12, I13, . . . , I1k, each of which is similar to the above-described driving set signal 11. In addition, the way in which each of the light sources for position detection 12A1, 12A2, 12A3, . . . , 12Ak is driven is determined by control signals S11, S12, S13, . . . , S1k, each of which is similar to the above-described control signal S1. Here, although only the light sources for position detection 12An are illustrated in FIG. 16, the same is applied to the light sources for position detection 12Bn. The light sources for position detection 12Bn are controlled by control signals, each of which is similar to the above-described control signal S2, and driving set signals, each of which is similar to the above-described driving set signal 12.

When the driving section IA and the light source for position detection 12An of the circuit illustrated in FIG. 15 are configured so that the multiple light sources for position detection 12An can be set to the different current values I11 to I1k by using the driving sections IA1 to IAk illustrated in FIG. 16 and can be driven by the different control signals S11 to S1k, and when the driving section IB and the light source for position detection 12Bn are configured in the similar way, the circuit illustrated in FIG. 15 can determine all the pieces of the position information in the X direction and the Y direction in the present embodiment.

In this case, the method for controlling the control amount Ib in such a manner that Ha/Hb=1 can be obtained, which has been described above in the deriving of position information in the X direction, corresponds to an execution of a control in which the line of the light intensity of the second light emission distribution D2 is entirely shifted upward or downward. That is, as illustrated in dotted lines in FIG. 5, when the line of the light intensity of the second light emission distribution D2 is entirely shifted upward or downward by the amount of shift 6 in accordance with the position of the object to be detected Ob in the Y direction, the position of the intersection of the first light emission distribution D1 and the second light emission distribution D2 (corresponding to the position where Ha/Hb=1 is obtained) can be moved in the Y direction. Therefore, by changing the amount of shift 8 to obtain Ha/Hb=1, the position of the intersection can be controlled so as to match the position of the object to be detected Ob in the Y direction. Thus, on the basis of the amount of shift 6 at this time, the coordinate y of the object to be detected Ob can be derived.

Figure 7:
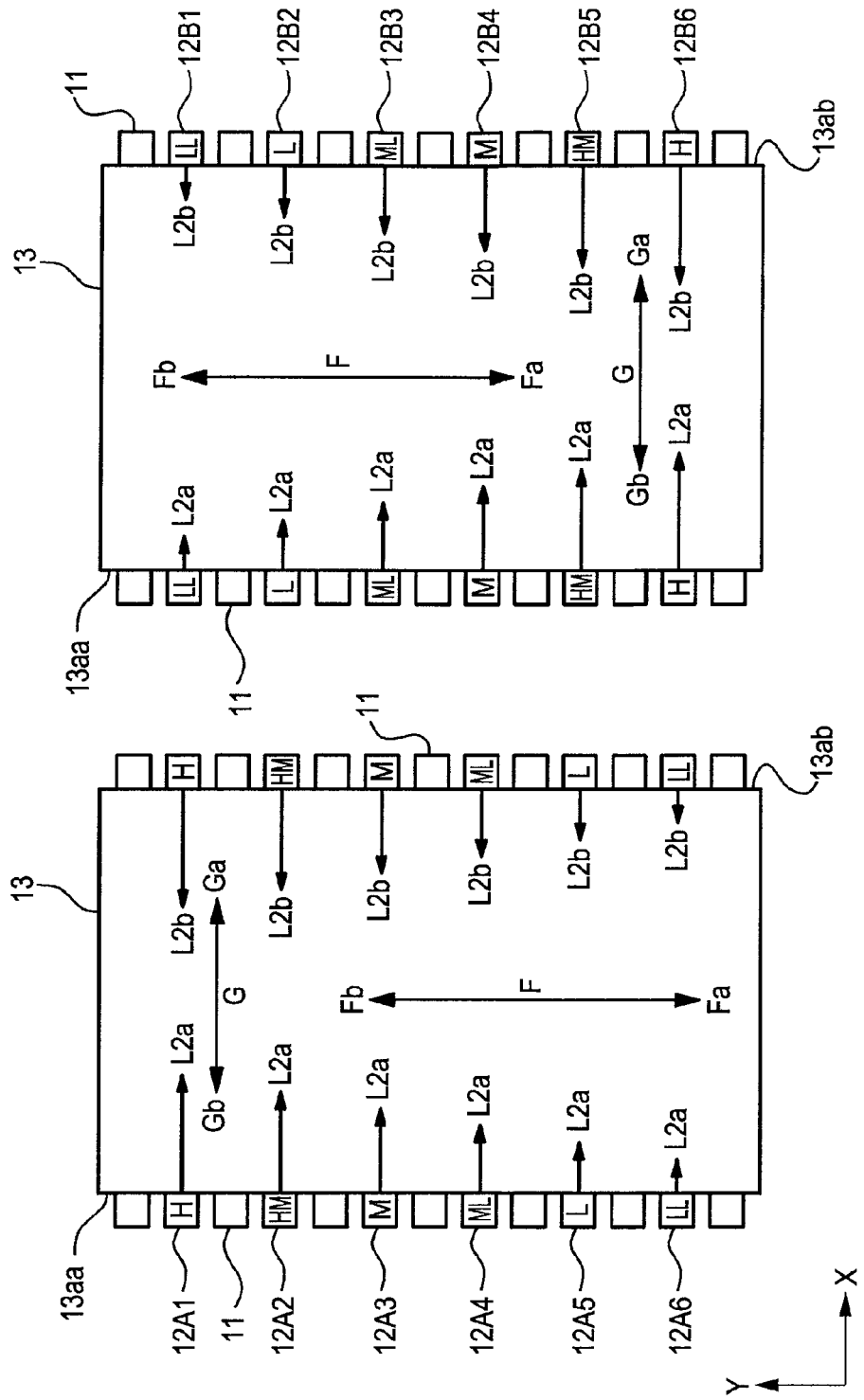
FIG. 7A is a rear view illustrating another way in which light sources for position detection for forming the first light emission distribution illuminate in the first embodiment.
FIG. 7B is a rear view illustrating another way in which light sources for position detection for forming the second light emission distribution illuminate in the first embodiment.

FIGS. 7A and 7B are rear views illustrating another method for forming the first light emission distribution D1 and the second light emission distribution D2. In this method, the first light emission distribution D1 and the second light emission distribution D2 are respectively formed by using all the light sources for position detection 12An and 12Bn, as illustrated in FIGS. 7A and 7B, without dividing the light sources for position detection 12An and 12Bn into the first group and the second group as in the embodiment described above. In the figures, H, HM, M, ML, L, and LL are indicated in the order from the highest discharged light intensity. In this case, the discharged light intensities are set for all the light sources for position detection including for those illustrated in dotted lines in FIGS. 14A and 14B. With this configuration, although more complicated control is needed because the luminance of each of the light sources for position detection 12An and 12Bn needs to be switched in a drive interval period, the first light emission distribution D1 and the second light emission distribution D2 are formed by using a larger number of light sources for position detection 12An and 12Bn, and this can increase uniformity in the tilts of light emission distributions, whereby there is an advantage in that the accuracy of the position information can be improved.

As described above, in the present embodiment, for the position information regarding the object to be detected Ob in the X direction, the coordinate x is derived by forming the third light emission distribution D3 and the fourth light emission distribution D4 respectively tilted toward the one side Ga and the other side Gb of the perpendicular direction G in which the position detection light beams L2a emitted from the first group of light sources for position detection 12An and the position detection light beams L2b emitted from the second group of light sources for position detection 12Bn are transmitted along the transmission direction of the light guide plate 13. On the other hand, for the position information in the Y direction, the coordinate y is derived by gradually decreasing the discharged light intensities Ea and Eb of the multiple light sources for position detection 12An and 12Bn respectively toward the one side Fa and the other side Fb of the arrangement direction F to form the first light emission distribution D1 tilted toward the one side Fa, and the second light emission distribution D2 tilted toward the other side Fb, and by obtaining the ratio of the detected light intensities (output components) on the basis of the light emission distributions D1 and D2. By performing the derivation of the coordinate x and the derivation of the coordinate y alternately, the plan position of the object to be detected Ob can be determined.

According to the present embodiment, while the electro-optical panel 20, especially of the type that controls a light modulation state for each pixel, is being illuminated to perform display, the position of the object to be detected Ob on the display screen can be detected. At this time, the plan position information regarding the object to be detected Ob can be obtained by causing the position detection light beams L2a and L2b to enter from the light incident faces 13aa and 13ab of the light guide plate 13 and to be emitted from the light emitting face 13b intersecting (perpendicular to, in the illustrated example) the light incident faces 13aa and 13ab, and by detecting the light beams reflected by the object to be detected Ob by using the photosensor 15. Therefore, compared with a method of the related art in which multiple light sources, photosensors, and optical switches or the like are arranged on the display screen, the number of elements for position detection can be reduced drastically, and significant simplification of the structure, reduction in the cost of manufacture, and reduction in the power consumption can be obtained.

In particular, in the present embodiment, by using arranged multiple light sources for position detection, tilted light emission distributions can be precisely formed, thereby improving the accuracy of the position information. In addition, since position information regarding both X and Y directions can be obtained by using two groups of light sources for position detection 12An and 12Bn arranged so as to face each other in the X direction, there is another advantage in that the accuracy of the position information can be improved with a small number of elements used.

Furthermore, in the present embodiment, the position information regarding each of the X direction and the Y direction is determined by using a corresponding pair of light emission distributions tilted toward opposite sides, that is, the first and second light emission distributions D1 and D2 or the third and fourth light emission distributions D3 and D4. Thus, this can eliminates influence, on position information, of fluctuation at absolute level in the detected light intensities of the photosensor 15 due to outside light beams, and of fluctuation/variation at absolute level in the individual detected light intensities (output components) due to fluctuation/variation in the light transmissivity of an internal optical element inside the position detecting device or electro-optical device, such as the light guide plate 13, the reflection plate 14, the optical sheets 16, the electro-optical panel 20, or the cover plate 30. That is, when the position information regarding the X direction is derived, by using the ratio of detected light intensities Ha/Hb (that is also the ratio of detected light intensities of the position detection light beams L2a and L2b) based on the third light emission distribution D3 and the fourth light emission distribution D4, influence at absolute level of the discharged light intensities Ea and Eb, the emitted light intensities, and the detected light intensities of the position detection light beams L2a and L2b is suppressed. When the position information regarding the Y direction is derived, by using the ratio of detected light intensities based on the first light emission distribution D1 and the second light emission distribution D2, such influence at absolute level is suppressed in a similar way.

Furthermore, in the present embodiment, since the discharged light intensities Ea and Eb of the multiple light sources for position detection 12An and 12Bn respectively arranged along the light incident faces 13aa and 13ab are changed along the arrangement direction F to form the first light emission distribution D1 and the second light emission distribution D2 both tilted along the arrangement direction F in order to obtain the position information in the Y direction along the arrangement direction F, the tilts of the light emission distributions D1 and D2 to be used in derivation of position information change are less likely to be influenced by light guiding properties of the light guide plate 13 (for example, the light scattering structure described above). That is, since the tilts of the first light emission distribution D1 and the second light emission distribution D2 are formed by setting the discharged light intensities Ea and Eb of the multiple light sources for position detection 12An and 12Bn arranged in the direction of the tilts, the tilts are nearly independent of the way in which the position detection light beams L2a and L2b are transmitted inside the light guide plate 13. Therefore, light guiding properties of the light guide plate 13 can be set easily without being limited by the position detection function. For example, as in the present embodiment, the light guide plate 13 can also serve as a light guide plate for the illumination light beams L1.

Note that, in the present embodiment, the light emission distributions D1 and D2 are used only for the case of obtaining the position information in the Y direction. However, from the viewpoint where the position detection function is less likely to be influenced by the light guiding properties of the light guide plate 13, it can be considered that a similar structure is used also for the case of obtaining the position information in the X direction. That is, by forming arrangements of different multiple light sources for position detection along the light incident faces 13ac and 13ad of the light guide plate 13, and thereby forming two light emission distributions tilted toward opposite sides from each other in the X direction, the position information in the X direction may be derived from these light emission distributions.

Furthermore, in the present embodiment, the light emission distributions D1 and D2 are formed by respectively arranging the multiple light sources for position detection 12An and 12Bn along the light incident faces 13aa and 13ab facing each other of the light guide plate 13, and respectively setting the discharged light intensities Ea and Eb as described above. However, the light emission distributions D1 and D2 being tilted can be formed by using only either the multiple light sources for position detection 12An or 12Bn arranged along the light incident faces 13aa or 13ab. In this case, for example, in the case where only the multiple light sources for position detection 12An are provided, and the light sources for position detection 12Bn are not provided, the emitted light intensity is gradually decreased as the distance from the light incident face 13aa in the perpendicular direction G (X direction) increases, but since the positional coordinate y of the object to be detected Ob in the Y direction is derived on the basis of the ratio of the detected light intensity Ha attributable to the first light emission distribution D1 and the detected light intensity Hb attributable to the second light emission distribution D2, position information to be obtained is less likely influenced by variation in the emitted light intensity along the perpendicular direction G.

In addition, in the embodiment described above, the position information regarding the object to be detected Ob is derived on the basis of the ratio of the detected light intensity Ha attributed to the first light emission distribution D1 and the detected light intensity Hb attributed to the second light emission distribution D2. However, the invention is not limited to the case where the position information is derived on the basis of the ratio of the detected light intensities Ha and Hb. For example, since there is also a correlation between the coordinate y of the object to be detected Ob and a difference Ha-Hb between the detected light intensities Ha and Hb, the position information may be derived on the basis of the difference between the detected light intensities Ha and Hb. In either case, when the position information is derived by using both the detected light intensities Ha and Hb which are output components attributed to the respective light emission distributions, for example, by using any function using two output components such as $F=(Ma \cdot Ha)/(Mb \cdot Hb)$ or $F=Ma \cdot Ha - Mb \cdot Hb$ (Ma and Mb are both coupling coefficients), and the derivation of the position information can be performed in a more accurate and stable manner.

In the present embodiment, the multiple light sources for lighting 11 and the multiple light sources for position detection 12An are arranged together along the light incident face 13aa and the multiple light sources for lighting 11 and the multiple light sources for position detection 12Bn are arranged together along the light incident face 13ab, the light incident faces 13aa and 13ab being located on sides of the light guide plate 13 having a rectangular shape in plan view, the sides facing each other in the X direction, and the light scattering structure is provided so as to obtain a uniform light emission distribution of the illumination light beams L1 in the X direction of the light guide plate 13. Therefore, when the first light emission distribution D1 and the second light emission distribution D2 tilted toward the Y direction are formed by using the light sources for position detection 12An and 12Bn, uniformity in both the light emission distributions D1 and D2 in the X direction can be easily obtained. As a result, there is another advantage in that the position information regarding the object to be detected Ob in the X direction can be obtained more accurately.

Second Embodiment

Figure 8:
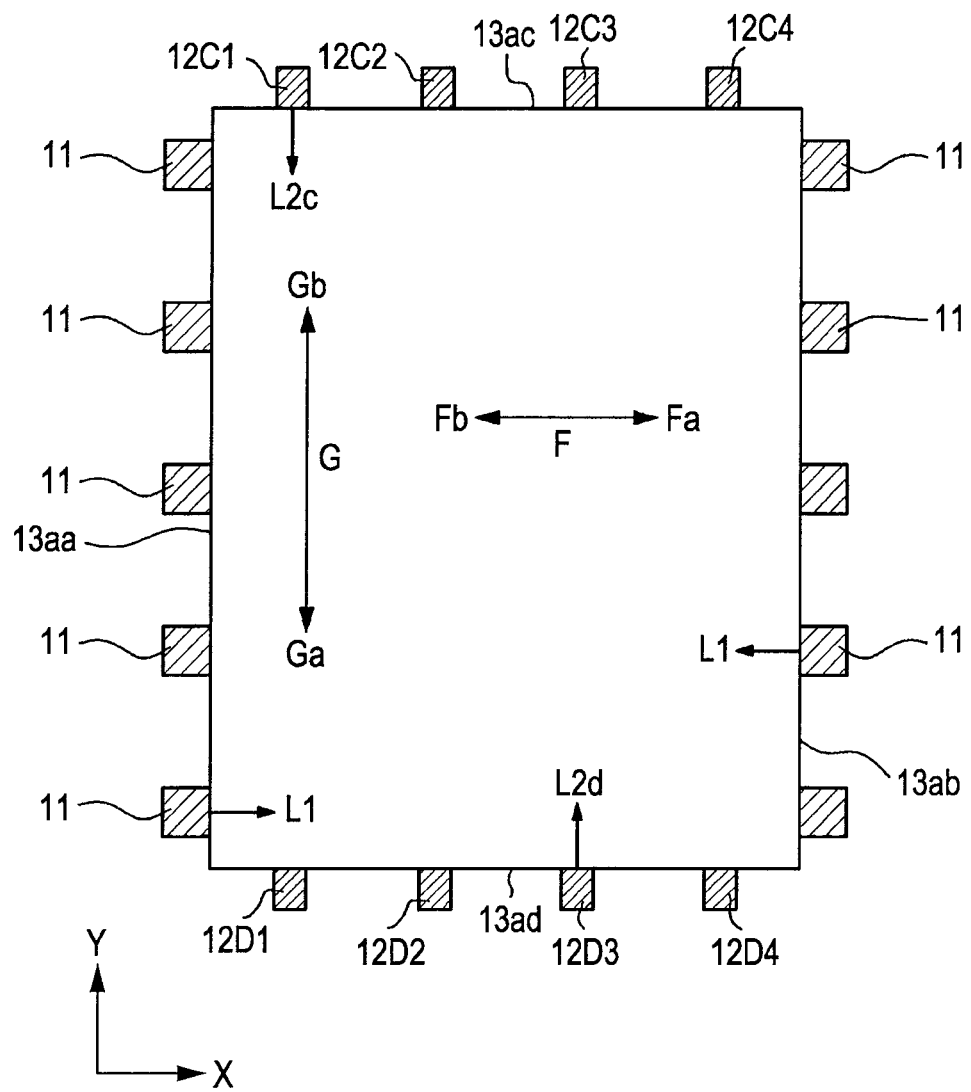
FIG. 8 is a schematic rear view illustrating an arrangement of a light guide plate, light sources for position detection, and light sources for lighting of a second embodiment.

Next, a second embodiment of the invention will be described with reference to FIG. 8. In the second embodiment, since a similar configuration to that of the first embodiment is used except for the arrangement of light sources for position detection, the same reference numerals are used to denote the same or similar components, and the descriptions of the components are omitted.

In the present embodiment, the light guide plate 13 has four end faces, which are the light incident faces 13aa, 13ab, 13ac and 13ad. Along one pair of light incident faces 13aa and 13ab facing each other, the multiple light sources for lighting 11 are arranged. Along the other pair of light incident faces 13ac and 13ad, multiple light sources for position detection 12Cn (n=1, . . . , k; k is a natural number of 2 or more) and 12Dn (n=1, . . . , k; k is a natural number of 2 or more) are respectively arranged.

In the present embodiment, as described above, the light sources for lighting 11 and the light sources for position detection 12Cn and 12Dn are arranged along the light incident faces 13aa, 13ab, 13ac and 13ad being located on different sides. Therefore, since the light incident faces 13aa and 13ab can be provided with only the light sources for lighting 11 and the light incident faces 13ac and 13ad can be respectively provided with only the light sources for position detection 12Cn and 12Dn, limitations on the arrangement of the light sources can be reduced. In particular, since the light sources for lighting 11 and the light sources for position detection 12Cn and 12Dn are arranged along light incident faces located on the sides adjacent to one another of the light guide plate 13 having a rectangular shape in plan view, the transmission direction of the illumination light beams L1 and that of position detection light beams L2c and L2d inside the light guide plate 13 are configured so as to have different directions from each other (a direction of the principal axis of the light sources for lighting 11 is different from that of the light sources for position detection 12Cn and 12Dn), which are perpendicular to each other in the illustrated example. Therefore, it is made possible that light guiding properties of the light guide plate 13 for the illumination light beams and that for the position detection light beams L2c and L2d are set substantially independently of each other by changing, for the X direction and the Y direction, the distribution of the light scattering structure of the light guide plate 13. Thus, the light guiding properties for the respective light beams can be optimized.

Furthermore, in the present embodiment, the light sources for lighting 11 are arranged along the light incident faces 13aa and 13ab located on the longer sides of the light guide plate 13, and the light sources for position detection 12Cn and 12Dn are arranged along the light incident faces 13ac and 13ad located on the shorter sides thereof. This configuration, in which the light sources for lighting 11 are arranged along the longer sides, has an advantage to obtain a uniform light emission distribution of the illumination light beams. In addition, when the third and fourth light emission distributions D3 and D4 tilted toward the transmission direction of the position detection light beams L2c and L2d are formed, the light guiding distance in the transmission directions, which is the coordinate range in the directions obtained by the light emission distributions D3 and D4, increases. Thus, this reduces the distance in the directions in which the light emission distributions D1 and D2 are tilted, whereby there is also an advantage in that the number of the light sources for position detection 12Cn and 12Dn can be reduced.

Third Embodiment

Figure 9:
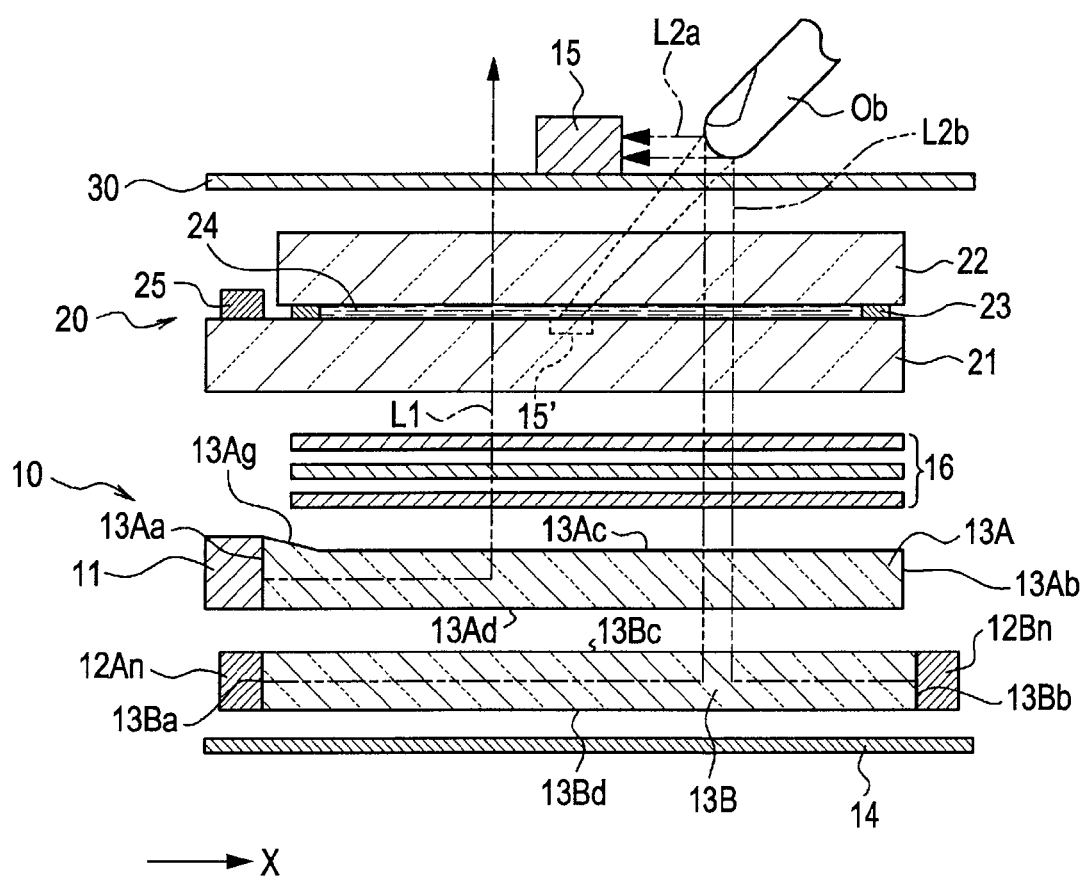
FIG. 9 is a schematic sectional view schematically illustrating a schematic configuration of a position detecting device and an electro-optical device of a third embodiment.
Figure 10:
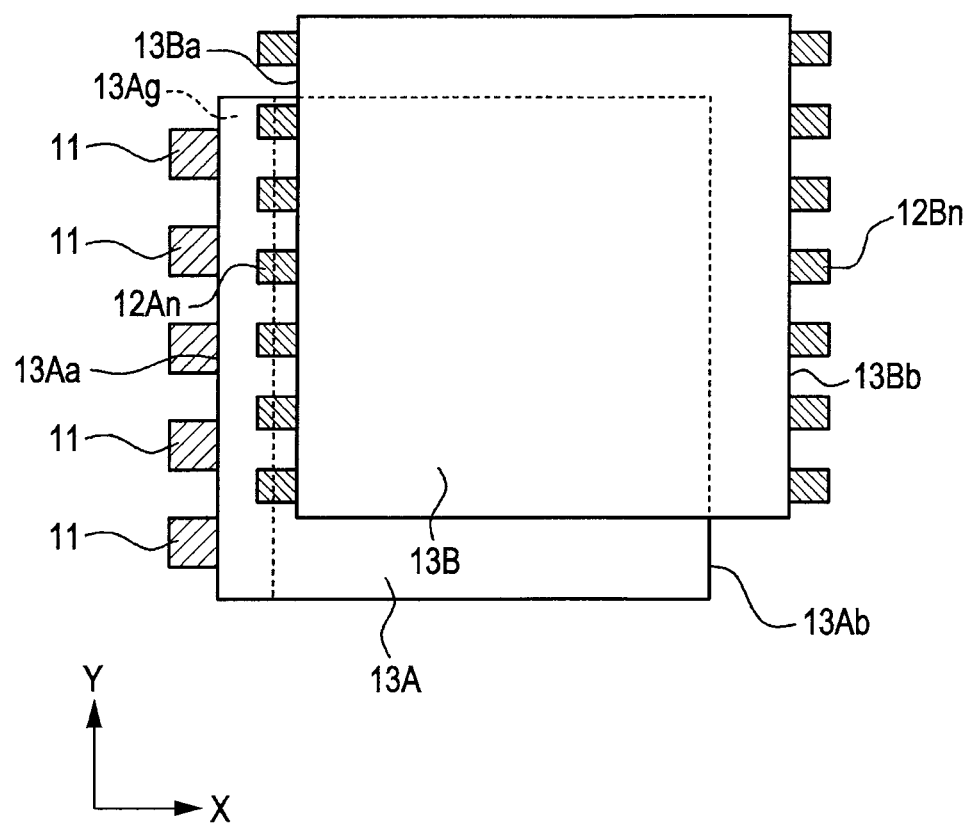
FIG. 10 is a schematic rear view illustrating an arrangement of a light guide plate for lighting, a light guide plate for position detection, light sources for position detection, and light sources for lighting of the third embodiment.

Next, a third embodiment of the invention will be described with reference to FIGS. 9 and 10. In the third embodiment, since a similar configuration to that of the first embodiment is used except for the configuration of light guide plates and the arrangement of light sources for lighting and the light sources for position detection associated therewith, the same reference numerals are used to denote the same or similar components, and the descriptions of the components are omitted.

In the present embodiment, a light guide plate for lighting 13A that the illumination light beams L1 discharged from the light sources for lighting 11 enter from a light incident face 13Aa located at one side of the light guide plate for lighting 13A, are transmitted therethrough, and are emitted from a light emitting face 13Ac, and a light guide plate for position detection 13B that the position detection light beams L2a and L2b discharged from the light sources for position detection 12An and 12Bn respectively enter from light incident faces 13Ba and 13Bb facing each other, are transmitted therethrough, and are emitted from a light emitting face 13Bc are provided. The light guide plate for lighting 13A and the light guide plate for position detection 13B are arranged so that the light emitting faces 13Ac and 13Bc overlaps each other in plan view and so that both the light emitting faces 13Ac and 13Bc are overlapped with a display area of the electro-optical panel 20 in plan view. Note that although in the illustrated example the light guide plate for lighting 13A is arranged at the viewing side and the light guide plate for position detection 13B is arranged at the side opposite from the viewing side, they may be arranged in the opposite manner. Furthermore, the light guide plate for position detection 13B may be arranged closer to the viewing side than the electro-optical panel 20 is.

In the light guide plate for lighting 13A of the present embodiment, the multiple light sources for lighting 11 are arranged along the light incident face 13Aa, the illumination light beams L1 enter the inside only from this light incident face 13Aa, and the internally transmitted light beams travel only in the X direction toward an outer edge section 13Ab located at the opposite side from the light incident face 13Aa. Thus, the light guide plate for lighting 13A is configured so that scattering and deflection actions of the light scattering structure described above increase monotonously in the X direction in order to increase uniformity in a distribution of the light beams emitted from the light emitting face 13Ac. With such a light scattering structure, the illumination light beams L1 entering from the light emitting face 13Aa are emitted substantially uniformly from across the light emitting face 13ac.

Furthermore, in the light guide plate for lighting 13A, an inclined face 13Ag that is inclined toward the outer edge section 13Ab is provided at an end of the light emitting face 13Ac adjacent to the light incident face 13Aa. With this inclined face 13Ag, the thickness of the light incident face 13Aa (the width in a vertical direction in the figure) is greater than that of a main section of the light guide plate for lighting 13A which is an area in the light emitting face 13Ac located between the inclined face 13Ag and the outer edge section 13Ab. With this configuration, while keeping the main section of the light guide plate 13A thin, light emitting elements such as LEDs having a thicker luminescent face than the main section can be used as light sources for lighting 11. Furthermore, since the illumination light beams L1 discharged from the luminescent face can be guided to the main section while being blocked by the surface of the inclined face 13Ag, the discharged light intensities of the light sources for lighting 11 can be increased and, at the same time, the illuminating light beams L1 can be effectively utilized in illumination or display.

On the other hand, in the light guide plate for position detection 13B, the multiple light sources for position detection 12An are arranged along the light incident face 13Ba and the multiple light sources for position detection 12Bn are arranged along the light incident face 13Bb. Therefore, the arrangement of the light guide plate for position detection 13B and the light sources for position detection 12An and 12Bn is similar to that of the first embodiment. Thus, a method of position detection using the light sources for position detection 12An and 12Bn, the light guide plate for position detection 13B, and the photosensor 15 is similar to that described for the first embodiment.

In the present embodiment, the light guide plate for position detection 13B is provided dedicated for guiding the position detection light beams L2a and L2b. Therefore, the light guiding properties of the light guide plate 13B can be designed dedicated for position detection without being influenced by the light guiding properties for guiding the illumination light beams L1.

Fourth Embodiment

Figure 11:
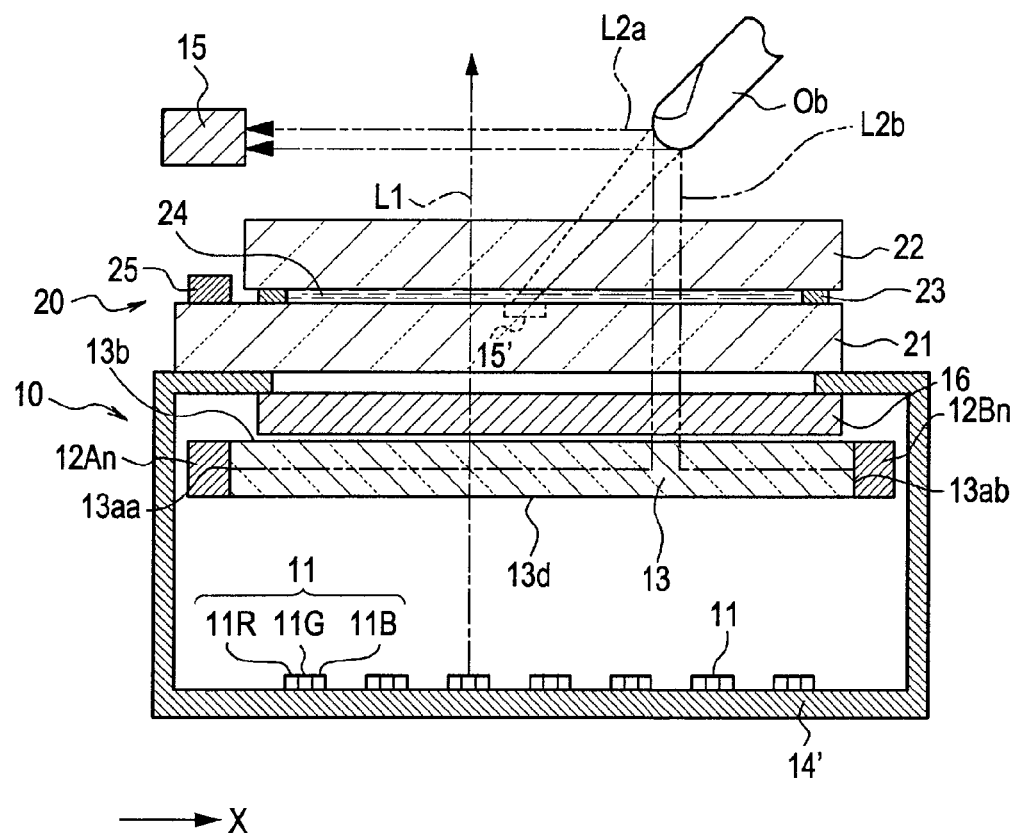
FIG. 11 is a schematic sectional view schematically illustrating a schematic configuration of a position detecting device and an electro-optical device of a fourth embodiment.

Next, a fourth embodiment of the invention will be described with reference to FIG. 11. FIG. 11 is a schematic sectional view schematically illustrating a configuration of the position detecting device and the electro-optical device according to the fourth embodiment of the invention. Also in the present embodiment, the same reference numerals are used to denote the same or similar components to those of the first embodiment, and the descriptions of the components are omitted.

In the present embodiment, the multiple light sources for lighting 11 are arranged two-dimensionally (that is, in a matrix) on the bottom of a base 14' having a container shape. In the illustrated example, each of the light sources for lighting 11 is formed of three light emitting elements (LED) 11R, 11G, and 11B respectively having luminescent colors R (red), G (green), and B (blue), but may be configured in any form. In addition, the light guide plate 13 is arranged at the viewing side apart from the multiple light sources for lighting 11. The light guide plate 13 is basically configured in a similar manner to the light guide plate 13 of the first embodiment or the light guide plate for position detection 13B of the third embodiment, and has the multiple light sources for position detection 12An and 12Bn respectively arranged along the light incident faces 13aa and 13ab. Furthermore, the light diffusing plate 16 is arranged between the light guide plate 13 and the electro-optical panel 20. Note that the light diffusing plate 16 may be arranged, for example, between the light sources for lighting 11 and the light guide plate 13, as long as the light diffusing plate 16 is arranged some distance apart from the multiple light sources for lighting 11.

In the illustrated example, the container-shaped base 14' accommodates and holds the light sources for lighting 11, the light sources for position detection 12An and 12Bn, the light guide plate 13, and the light diffusing plate 16 to form an integrated illumination unit. Note that, the inner face of the bottom and the inner faces of the sides of the base 14' are formed as reflection surfaces so that the illumination light beams L1 can be effectively emitted.

In the present embodiment, the illumination light beams L1 are discharged from the multiple light sources for lighting 11 on the bottom of the base 14', pass through the light guide plate 13 and the light diffusing plate 16, illuminate the electro-optical panel 20, and are emitted to the viewing side. That is, the illumination structure of the present embodiment is a direct-type backlight structure.

Also in this embodiment, the position detection light beams L2a and L2b are emitted from the light emitting face 13b of the light guide plate 13 and light beams reflected by the object to be detected Ob are detected by the photosensor 15 or 15'. Thus, information regarding a plan position of the object to be detected Ob can be obtained in the present embodiment in a similar manner to the first embodiment.

Fifth Embodiment

Figure 12:
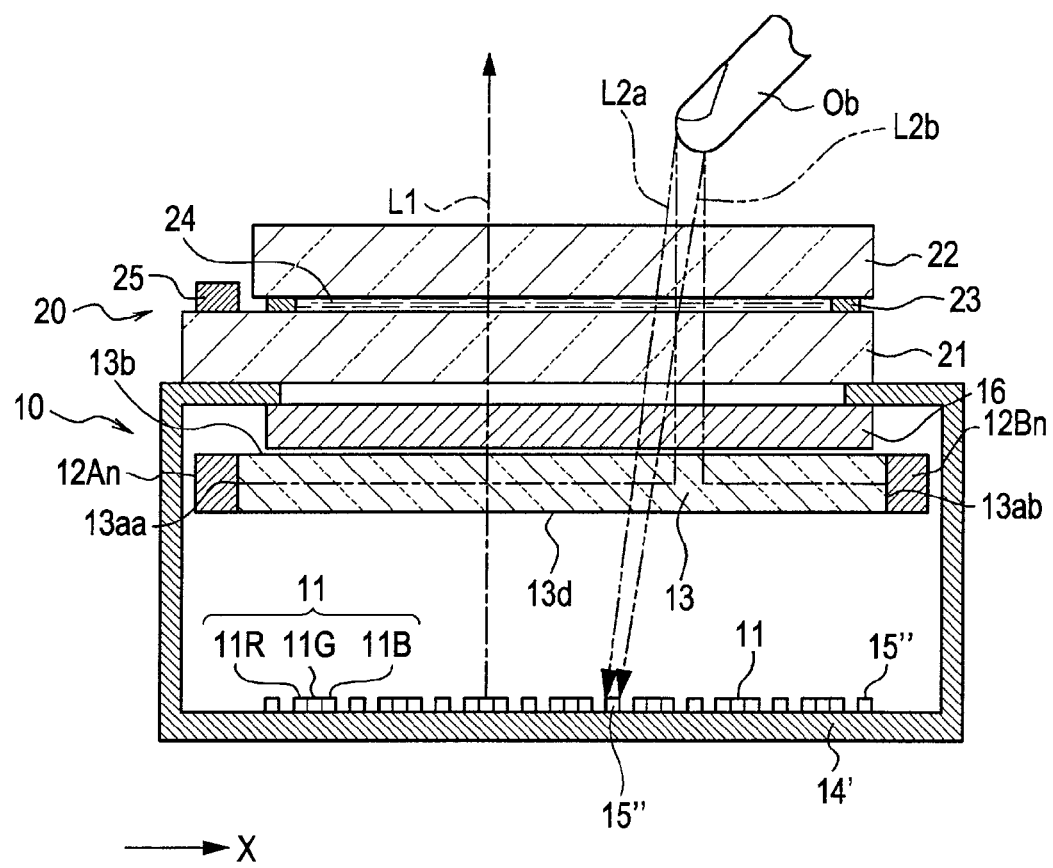
FIG. 12 is a schematic sectional view schematically illustrating a schematic configuration of a position detecting device and an electro-optical device of a fifth embodiment.

Next, a fifth embodiment of the invention will be described with reference to FIG. 12. Note that, in the present embodiment, the same reference numerals are used to denote the same or similar components to those of the fourth embodiment, and the descriptions of the components are omitted.

The present embodiment has basically the same structure as the fourth embodiment, except that multiple photosensors 15" are arranged on the inner bottom surface of the base 14'. When the position detection light beams L2a and L2b are emitted to the viewing side and reflected by the object to be detected Ob, some of the reflected light beams return to the side opposite from the viewing side, pass through the electro-optical panel 20, the light diffusing plate 16 and the light guide plate 13, and then are detected by the photosensors 15" on the bottom of the base 14'. In this case, the multiple photosensors 15" in the illustrated example are arranged so as to be spaced apart from one another in plan view, and thus configured so that the reflected light beams can be detected with certainty. However, it may be sufficient to provide only a single photosensor 15" when the photosensor 15" is arranged at a position where the reflection light beams can be received from the entirety of a required plan range.

According to the embodiments of the invention, an advantage is obtained in that the position detecting device and the electro-optical device (display device) can be realized in which the optical position detecting unit can be configured at low cost and so as to have lower power consumption.

Note that, the lighting device and the electro-optical device of the invention are not limited to those illustrated in the above embodiments, and various modifications are conceivable within the scope of the invention.

The entire disclosure of Japanese Patent Application No. 2009-078365, filed Mar. 27, 2009 is expressly incorporated by reference herein.

What is claimed is:

1. An electro-optical device comprising:
   a light guide plate that is configured to transmit therethrough light beams entering from a light incident face thereof and to emit the light beams from a light emitting face intersecting the light incident face;
   first multiple light sources for position detection that are arranged along the light incident face and that discharge position detection light beams toward the light incident face;
   a photosensor that detects at least some of position detection light beams reflected by an object to be detected among the position detection light beams emitted from the light emitting face;
   a light source control unit that switches between a first driving mode and a second driving mode, the first driving mode being a mode in which discharged light intensities of the first multiple light sources are gradually decreased toward one side of an arrangement direction of the first multiple light sources and in which emitted light intensities of the position detection light beams emitted from the light emitting face exhibit a first light emission distribution tilted toward the one side of the arrangement direction, the second driving mode being a mode in which discharged light intensities of the first multiple light sources are gradually decreased toward another side opposite to the one side of the arrangement direction and in which emitted light intensities of the position detection light beams emitted from the light emitting face exhibit a second light emission distribution tilted toward the other side of the arrangement direction;

a position information derivation unit that derives position information regarding the object to be detected along the arrangement direction on the basis of output components of the photosensor respectively attributable to the first light emission distribution and the second light emission distribution; and an electro-optical panel that has a display area arranged so as to overlap in plan view the light emitting face of the light guide plate, the electro-optical an having first and second surface opposite to each other, wherein the light guide plate and the first multiple light sources are located at a side of the first surface of the electro-optical panel, and the photosensor is located at a side of the second surface of the electro-optical panel, and the position detection light beams reaches to the object through the electro-optical panel.

2. The electro-optical device according to claim 1,
wherein the display area is arranged at a light emitting side of the light emitting face with respect to the light guide plate, wherein the electro-optical device further comprises second multiple light sources for lighting that discharge illumination light beams toward the light incident face of the light guide plate, and wherein the second multiple light sources are arranged, together with the first multiple light sources, so as to be spaced apart from one another along the light incident face.

3. The electro-optical device according to claim 2,
wherein the light guide plate has a planar shape having multiple sides on which the light incident face is located, and wherein the light incident face that the position detection light beams enter and the light incident face that the illumination light beams enter are located on different sides.

4. The electro-optical device according to claim 1,
wherein the display area is arranged at a light emitting side of the light emitting face with respect to the light guide plate, wherein the electro-optical device further comprises second multiple light sources for lighting that discharge illumination light beams toward a face of the light guide plate at the opposite side from the light emitting face, and wherein the second multiple light sources are arranged so as to be spaced apart from one another in an area overlapped in plan view with the light emitting face.

5. The electro-optical device according to claim 1, wherein the light source control unit alternately forms the first light emission distribution and the second light emission distribution.

6. The electro-optical device according to claim 1, wherein the light guide plate includes two light incident faces facing each other, wherein the first multiple light sources are arranged along the two light incident faces, and the light source control unit forms the first light emission distribution and the second light emission distribution by gradually decreasing the discharged light intensities of the first multiple light sources arranged along the two light incident faces simultaneously toward the same side of the arrangement direction.

7. The electro-optical device according to claim 6, wherein by alternately driving two groups of the first multiple light sources arranged along the two light incident faces, the light source control unit alternately forms a third light emission distribution tilted toward one side of a direction intersecting the arrangement direction and a fourth light emission distribution tilted toward another side opposite to the one side of the direction intersecting the arrangement direction, and the position information derivation unit derives position information regarding the object to be detected along the direction intersecting the arrangement direction on the basis of output components of the photosensor respectively attributable to the third light emission distribution and the fourth light emission distribution.

* * * * *